(12) United States Patent
Abou-Rizk et al.

(10) Patent No.: US 11,405,467 B2
(45) Date of Patent: Aug. 2, 2022

(54) AUTOMATED INITIALIZATION IN A LUMINAIRE OR OTHER RADIO FREQUENCY POSITIONING NODE BASED SYSTEM

(71) Applicant: ABL IP HOLDING LLC, Conyers, GA (US)

(72) Inventors: Mitri J. Abou-Rizk, Newton, MA (US); Pranav Kuber, Somerville, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 95 days.

(21) Appl. No.: 17/091,326

(22) Filed: Nov. 6, 2020

(65) Prior Publication Data

US 2022/0150311 A1 May 12, 2022

(51) Int. Cl.
*H04L 67/125* (2022.01)
*H04B 17/318* (2015.01)
(Continued)

(52) U.S. Cl.
CPC ......... *H04L 67/125* (2013.01); *H04B 17/318* (2015.01); *H04L 41/0806* (2013.01);
(Continued)

(58) Field of Classification Search
None
See application file for complete search history.

(56) References Cited

U.S. PATENT DOCUMENTS 7,352,972 B2  4/2008  Franklin
7,734,181 B2  6/2010  Bahar
(Continued)

OTHER PUBLICATIONS

Wikipedia, "Assignment problem," downloaded at https://en.wikipedia.org/wiki/Assignment_problem, last edited on Mar. 18, 2019, 5 pages.

(Continued)

*Primary Examiner* — Anh Q Tran
(74) *Attorney, Agent, or Firm* — RatnerPrestia

(57) ABSTRACT

A luminaire-based positioning system including a plurality of luminaires, each respective luminaire including a luminaire identifier. The system includes a gateway including a luminaire node map of commissioned luminaires with a commissioned luminaire identifier and commissioned location coordinates of each commissioned luminaire. The gateway includes an undesignated luminaire roster of undesignated luminaires with a set of undesignated location coordinates. Further, the gateway includes a plurality of projected received signal strength indication (RSSI) values. Additionally, the gateway includes programming to determine an association of an uncommissioned luminaire to a safest fit undesignated luminaire of the undesignated luminaire roster. Further, programming to assign to the uncommissioned luminaire the set of undesignated location coordinates of the safest undesignated luminaire. Additionally, programming to adjust the luminaire node map by adding a new set of commissioned location coordinates with the uncommissioned luminaire identifier that most safely fit the determined set of uncommissioned location coordinates.

20 Claims, 11 Drawing Sheets

(51) Int. Cl.

| | |
|---|---|
| *H04L 41/0806* | (2022.01) |
| *H04L 67/10* | (2022.01) |
| *H04W 4/029* | (2018.01) |
| *H04W 4/80* | (2018.01) |
| *H05B 47/19* | (2020.01) |
| *H04W 84/18* | (2009.01) |
| *H04W 4/02* | (2018.01) |
| *H04W 4/33* | (2018.01) |
| *H04W 8/00* | (2009.01) |
| *H04W 4/021* | (2018.01) |

(52) U.S. Cl.
CPC ............ *H04L 67/10* (2013.01); *H04W 4/023* (2013.01); *H04W 4/029* (2018.02); *H04W 4/33* (2018.02); *H04W 4/80* (2018.02); *H04W 8/005* (2013.01); *H05B 47/19* (2020.01); *H04W 4/021* (2013.01); *H04W 84/18* (2013.01)

(56) References Cited

U.S. PATENT DOCUMENTS

| | | | | |
|---|---|---|---|---|
| 8,928,232 | B2 * | 1/2015 | Aggarwal | H05B 47/11 315/153 |
| 2015/0147067 | A1 | 5/2015 | Ryan et al. | |
| 2017/0245351 | A1 * | 8/2017 | Leinen | H05B 45/12 |
| 2017/0318460 | A1 | 11/2017 | Kumar et al. | |
| 2018/0027598 | A1 * | 1/2018 | Roquemore, III | H04W 76/10 370/254 |
| 2019/0014250 | A1 | 1/2019 | Stout et al. | |
| 2020/0245424 | A1 | 7/2020 | Stout et al. | |
| 2020/0329341 | A1 | 10/2020 | Kuber et al. | |

OTHER PUBLICATIONS

Wikipedia, "DBSCAN," downloaded at https://en.wikipedia.org/wiki/DBSCAN, last edited on Mar. 28, 2019, 6 pages.

Bluetooth Blog, "Provisioning a Bluetooth Mesh Network Part 2," Ren, Kai, "Bluetooth Low Energy, Connected Device, Device Networks, Mesh," Sep. 25, 2017, Chapter 10 of the Bluetooth Mesh Networking Series, https://www.bluetooth.com/blog/provisioning-a-bluetooth-mesh-network-part-2/ (9 pages).

Notice of Allowance for U.S. Appl. No. 16/382,548, dated Feb. 3, 2021, 17 pages.

Entire patent prosecution history of U.S. Appl. No. 16/382,548, filed Apr. 12, 2019, entitled, "Self-Healing in a Luminaire or Other Radio Frequency Positioning Node Based System."

Entire patent prosecution history of U.S. Appl. No. 17/003,348, filed Aug. 26, 2020, entitled, "Out-of-Band Commissioning in a Luminaire or Other Radio Frequency Network Using Visible Light Communication."

Notice of Allowance for U.S. Appl. No. 17/003,348, dated Mar. 10, 2021, 17 pages.

\* cited by examiner

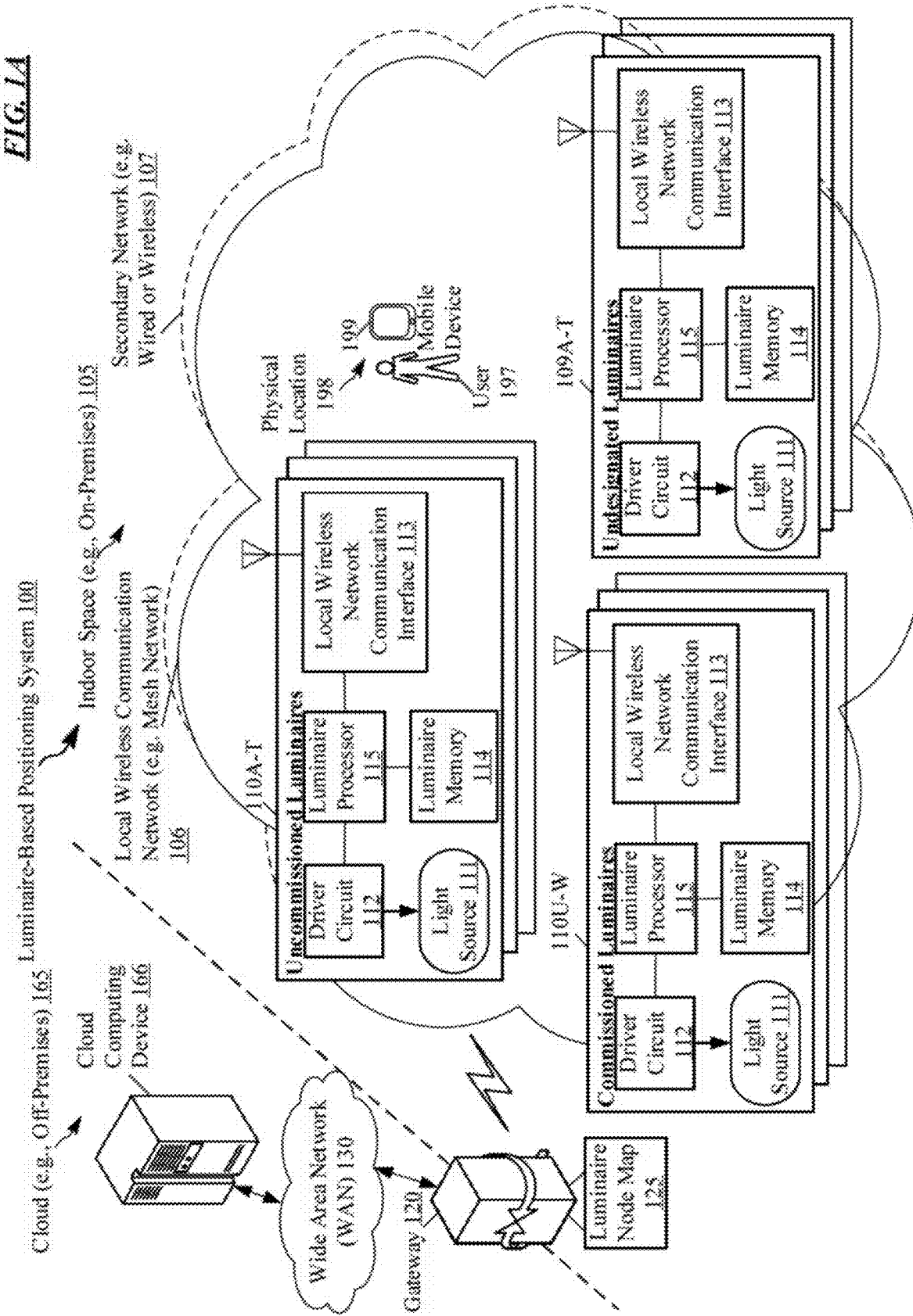

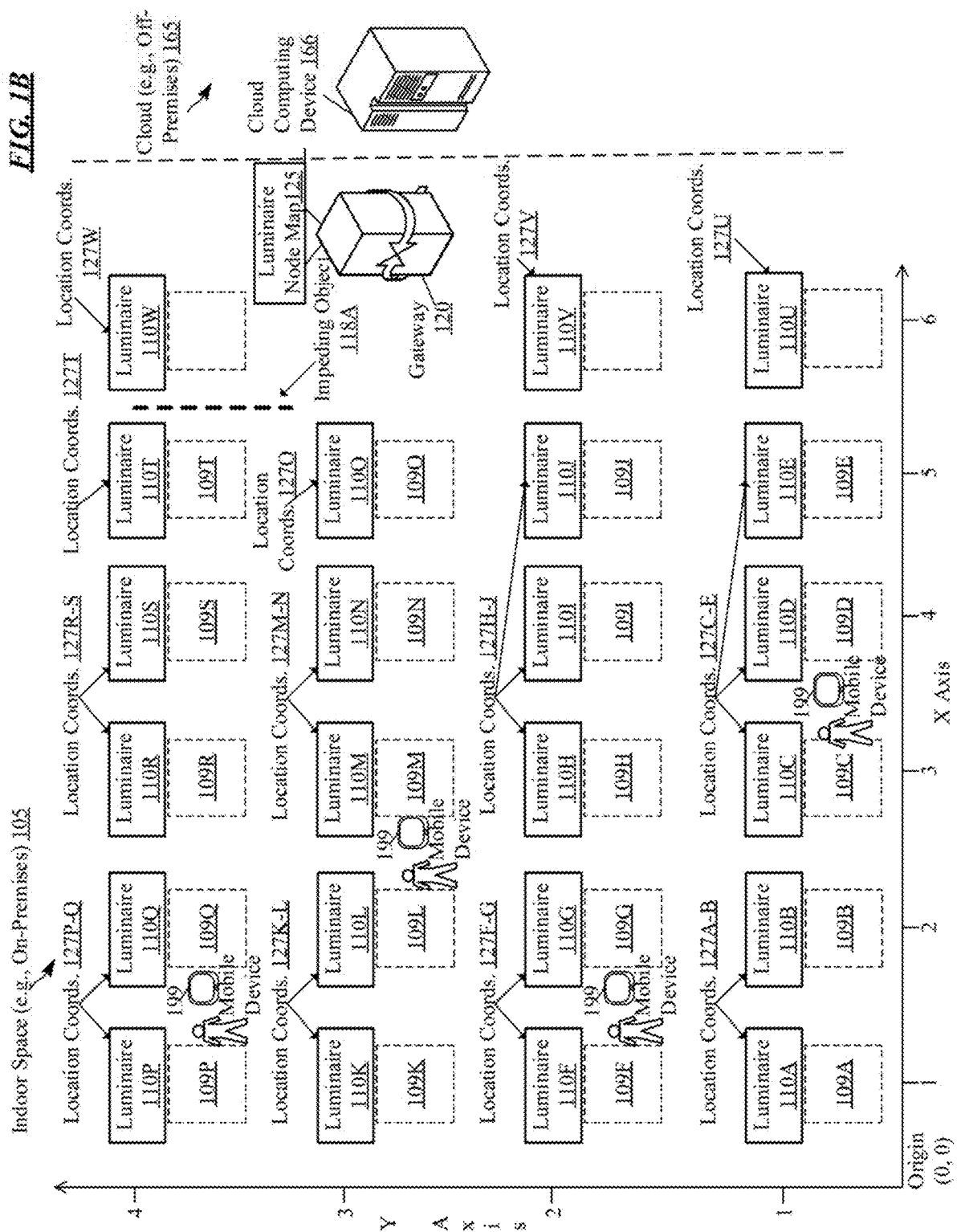

*FIG. 1C*

Luminaire Node Map 125

| Commissioned Luminaire Position | Commissioned Luminaire Identifier Settings 126U-W | Set of Commissioned Location Coordinates 127U-W | |
|---|---|---|---|
| | | X Location Coordinate | Y Location Coordinate |
| 1 | 110U | 6 | 1 |
| 2 | 110V | 6 | 2 |
| 3 | 110W | 6 | 4 |

Undesignated Luminaire Roster 132

| Undesignated Luminaire Identifier | Set of Undesignated Location Coordinates 127A-T | |
|---|---|---|
| | X Location Coordinate | Y Location Coordinate |
| 109A | 1 | 1 |
| 109B | 2 | 1 |
| 109C | 3 | 1 |
| 109D | 4 | 1 |
| 109E | 5 | 1 |
| 109F | 1 | 2 |
| 109G | 2 | 2 |
| 109H | 3 | 2 |
| 109I | 4 | 2 |
| 109J | 5 | 2 |
| 109K | 1 | 3 |
| 109L | 2 | 3 |
| 109M | 3 | 3 |
| 109N | 4 | 3 |
| 109O | 5 | 4 |
| 109P | 1 | 4 |
| 109Q | 2 | 4 |
| 109R | 3 | 4 |
| 109S | 4 | 4 |
| 109T | 5 | 4 |

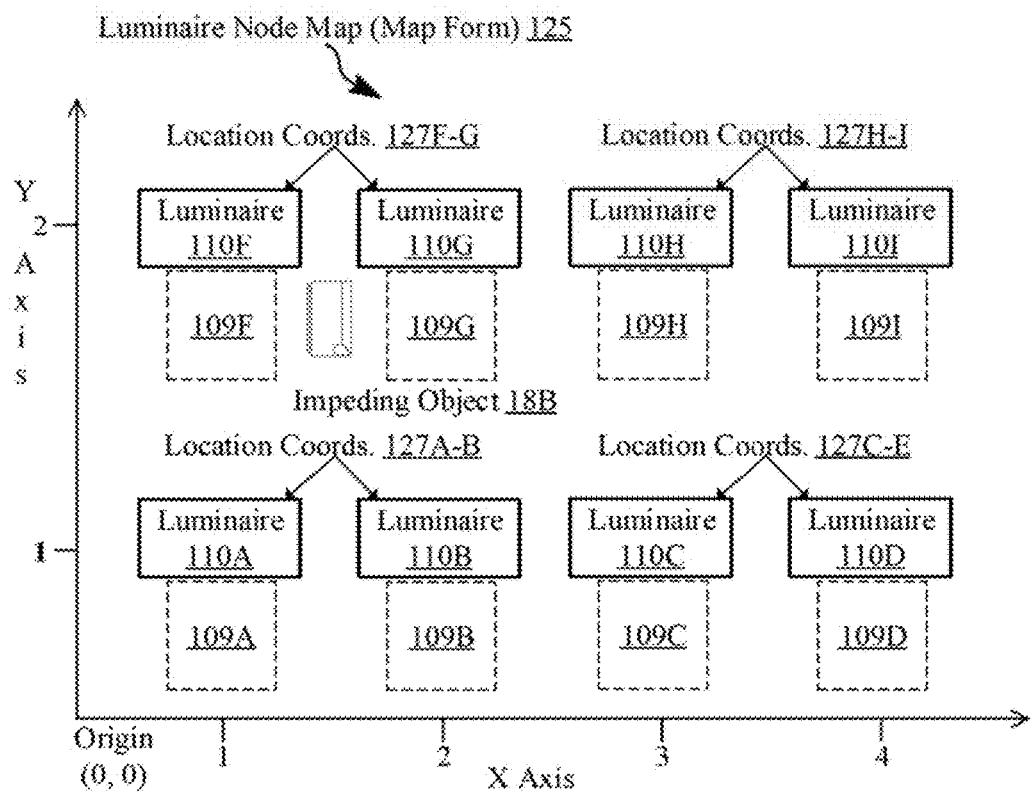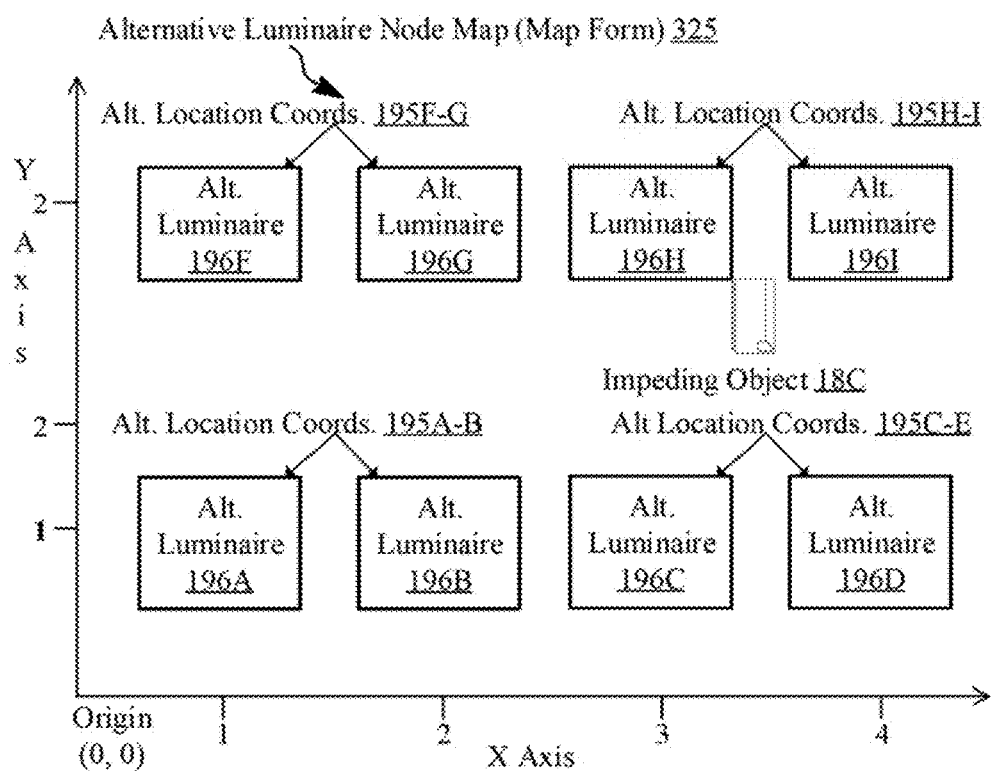
FIG. 1D

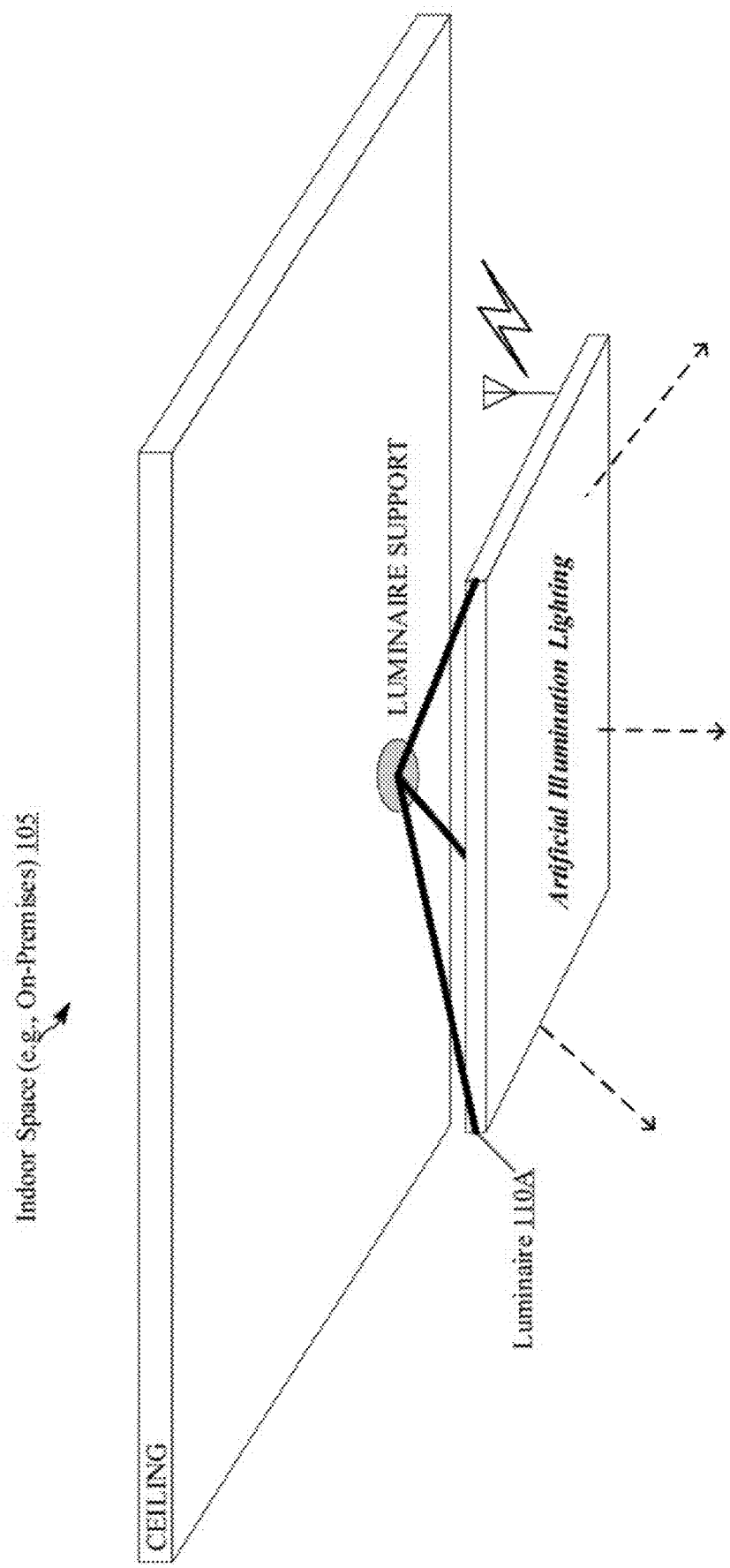

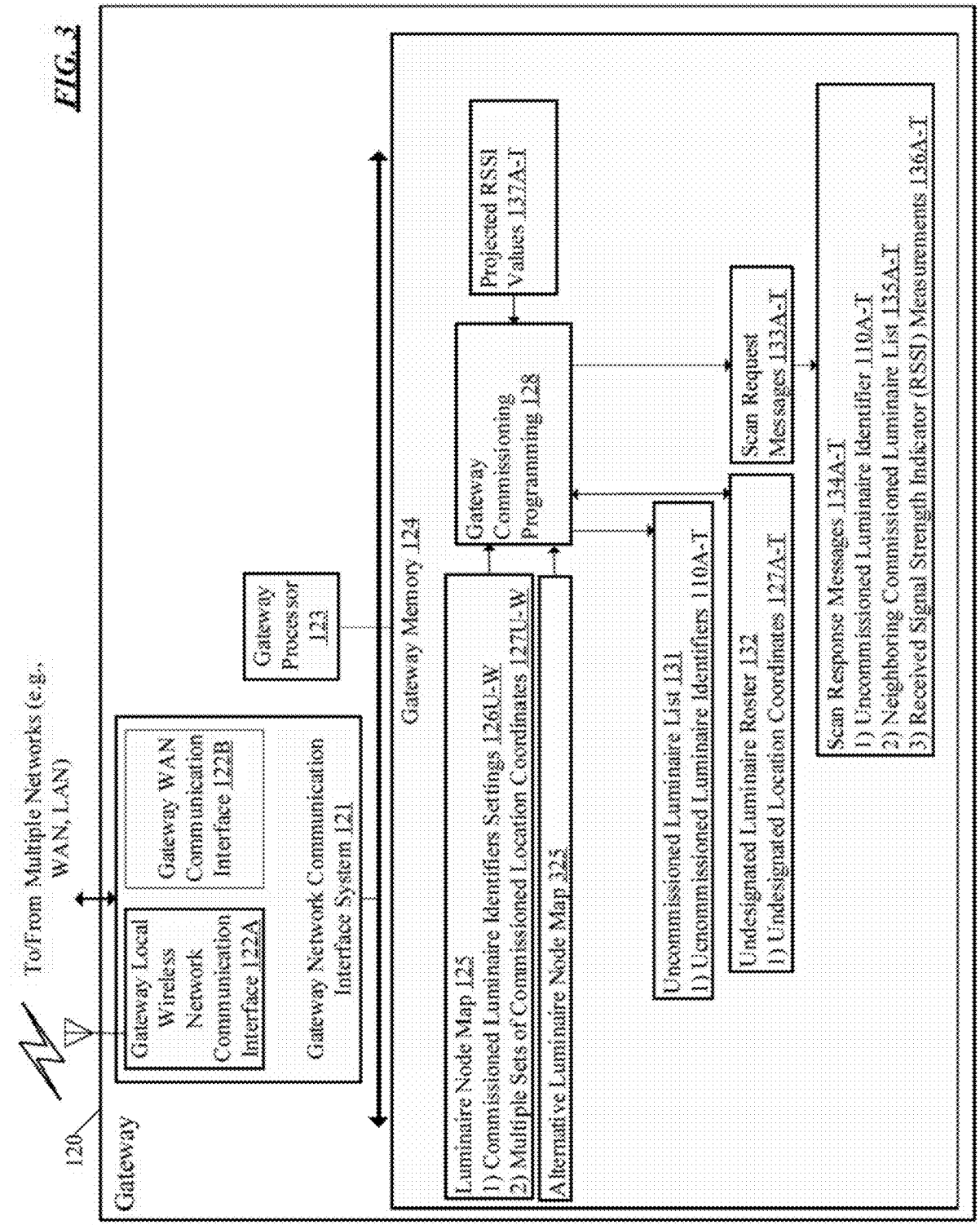

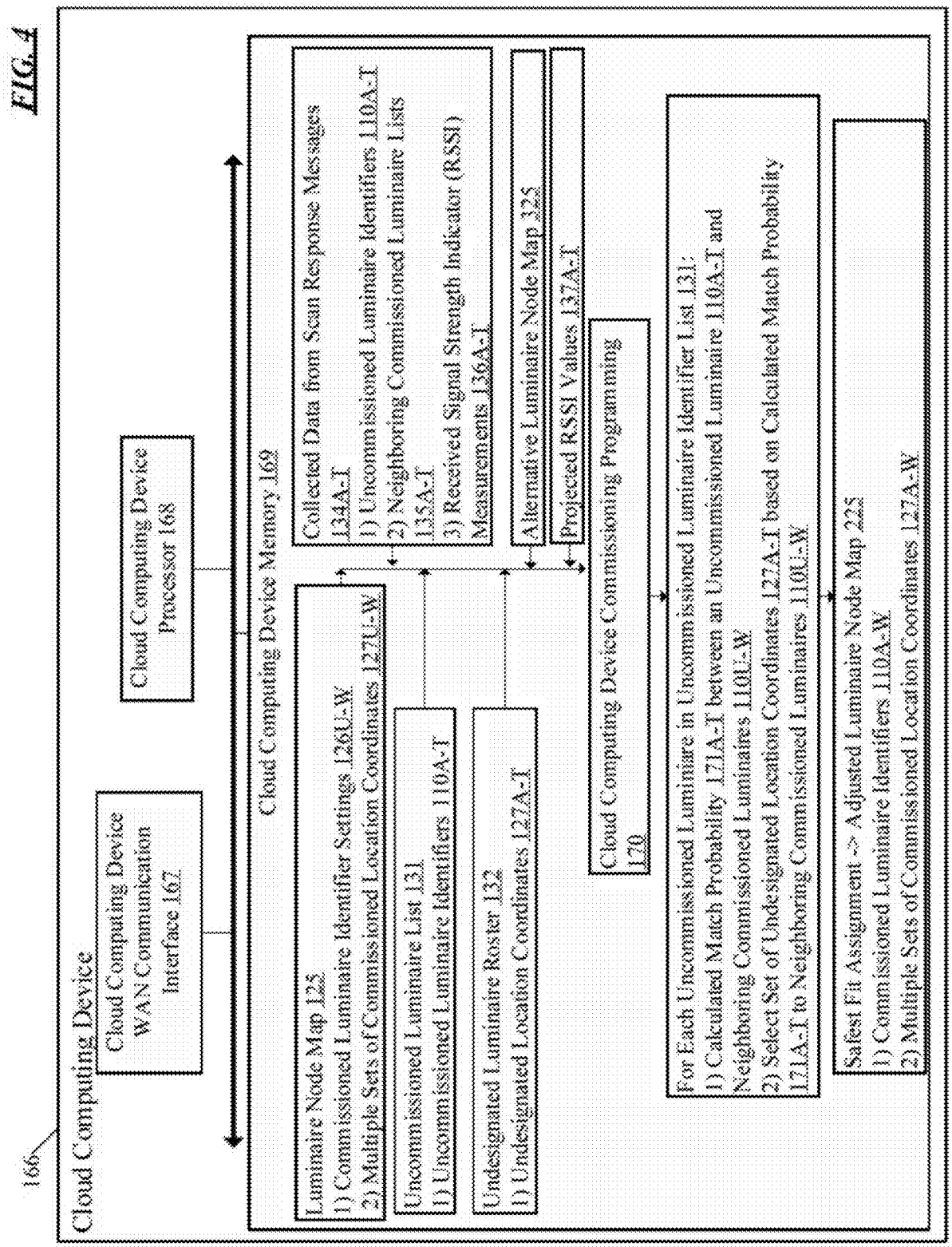

AUTOMATED INITIALIZATION IN A LUMINAIRE OR OTHER RADIO FREQUENCY POSITIONING NODE BASED SYSTEM

BACKGROUND

In a luminaire-based (e.g., indoor or outdoor) positioning system having commissioned luminaires networked through some wireless communications technology, e.g., Bluetooth Low Energy (BLE), typically it is necessary to know the physical locations of the luminaires. Without this knowledge, proximity of a mobile device (e.g., a smartphone) cannot be translated into an estimate of a physical location of the mobile device.

Therefore, such a luminaire-based positioning system typically requires a luminaire node map, which is a table of known physical location coordinates associated with each of the luminaires. For example, if the mobile device measures the relative strengths of signals from three nearby commissioned neighbors (e.g., luminaires) of known physical location coordinates and known broadcast power, those signal strengths may be used to estimate the mobile device's position relative to the luminaires.

Initially commissioning requires a technician to manually identify each uncommissioned luminaire, for example, by commanding all luminaires except for a selected luminaire in the indoor space to dim, and seeing which luminaire does not dim. The selected luminaire is then commissioned by hand, e.g. by using a mobile device running a commissioning application to identify individual uncommissioned luminaires, calling up the luminaire node map of the indoor space, and entering the new luminaire identifier into the luminaire node map at the position on the luminaire node map associated with the physical location of the selected luminaire. This process would then be repeated individually for every uncommissioned luminaire in the indoor space. This initial luminaire commissioning process is labor-intensive, and therefore slow and expensive. Typically, qualified technicians must travel to locations of the indoor space needing initial commissioning of luminaires and carry out manually commissioning of the new luminaires.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1A is a high-level functional block diagram of an example of a luminaire-based positioning system of networks and devices that support automated initialization of a luminaire node map of an indoor space and provide a variety of communications in support of determining a physical location of a mobile device of a user in the indoor space.

FIG. 1B is a schematic of the luminaire-based positioning system of FIG. 1A showing twenty uncommissioned luminaires and three commissioned luminaires.

FIG. 1C is the luminaire node map of the luminaire-based positioning system of FIGS. 1A-B depicted in a table format.

FIG. 1D is the luminaire node map of the luminaire-based positioning system of FIGS. 1A-B and an alternative luminaire node maps used in vector-based automatic commissioning

FIG. 2C is an isometric view of a luminaire mounted in the indoor space.

FIG. 3 is a block diagram of a gateway that communicates via the luminaire-based positioning system of FIGS. 1A-B and 2A.

FIG. 4 is a block diagram of a cloud computing device that communicates via the luminaire-based positioning system of FIGS. 1A-B and 2A.

DETAILED DESCRIPTION

Figure 2A:
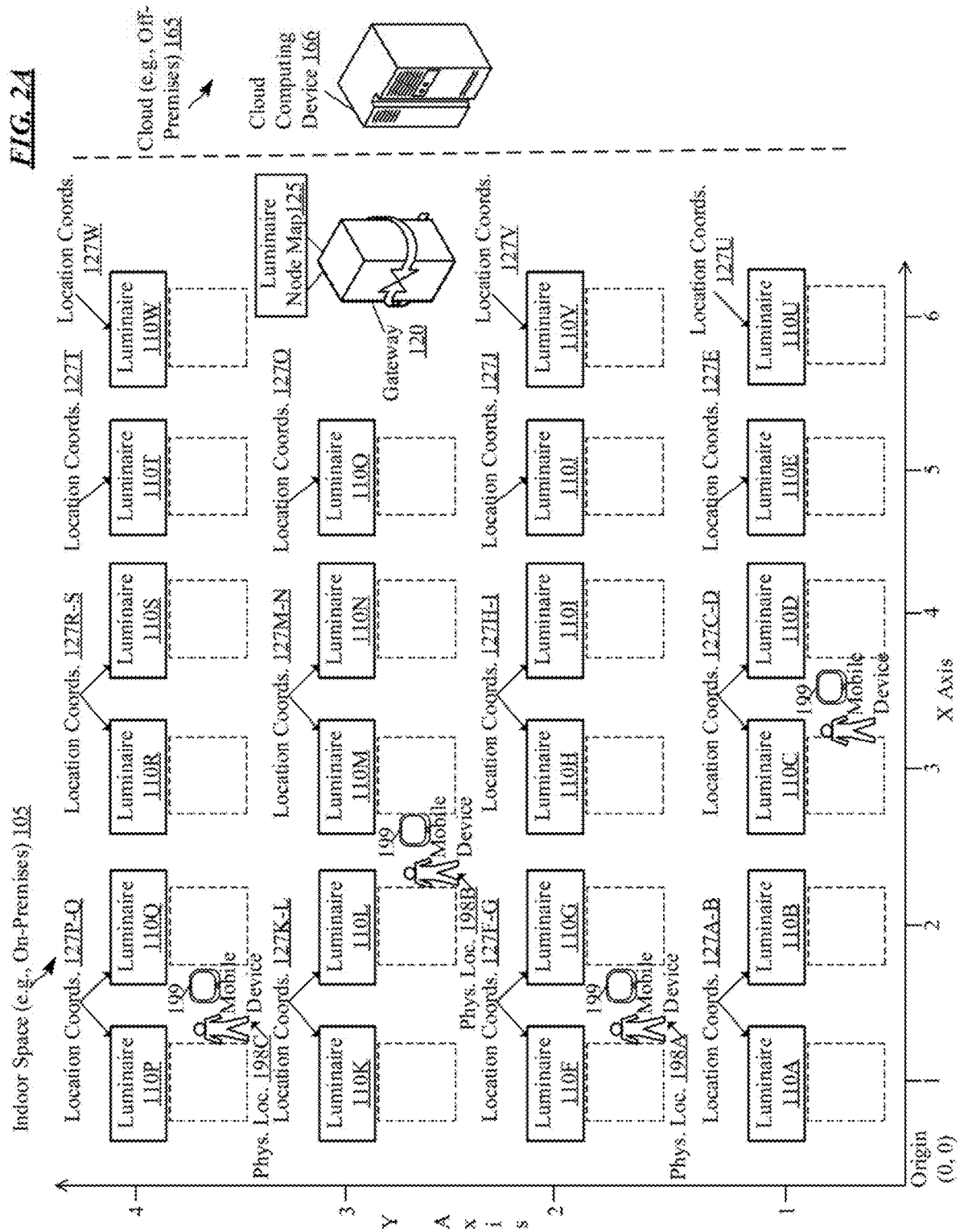
FIG. 2A is a schematic of the luminaire-based positioning system of FIG. 1A similar to FIG. 1B that includes a visual layout of twenty-three initially commissioned luminaires as represented by a respective set of location coordinates.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the examples, herein, the luminaires are just one example of a radio frequency (RF) positioning node, which includes additional components; however, the automated initialization can be applied to various other types of RF positioning nodes. Generally, the RF positioning node includes a minimum subset of components of the luminaire 110A-Z shown in FIG. 5, such as the local wireless network communication interfaces 113A-B (or other wired or wireless communication interfaces), memory 114 (including the depicted commissioning programming 116 and data), processor 115, and power supply 505. However, the RF positioning node does not have to include the light source 111, driver circuit 112, drive/sense circuitry 535, and detector(s) 565 components. A wireless beacon is an example of an RF positioning node that is a chip with a radio that emits a signal with a certain signal strength, small packets of information, and has an RF positioning node identifier. RF positioning nodes can be connected together via wired and/or wireless networks.

The examples in the drawings and described below relate to the automated commissioning of an RF positioning node map (e.g., a luminaire node map) of a previously uncommissioned RF positioning node (e.g., luminaire-based positioning) system. During commissioning, a virtual map of a physical installation of RF positioning nodes (e.g., luminaires) within an indoor space of a room, building, etc. or an outdoor space (e.g., streetlights) is created. The devices and techniques described herein automatically update the commissioned RF positioning node (e.g., luminaire) position records associated with respective sets of location coordinates in the RF positioning node map (e.g., luminaire node map). The location coordinates of undesignated RF positioning nodes (e.g. luminaires) are tracked in a roster, list, or map of undesignated RF positioning nodes (e.g., undesignated luminaire roster), and uncommissioned RF positioning nodes (e.g. luminaires) are assigned a set of location coordinates from the roster of undesignated RF positioning nodes (e.g., undesignated luminaire roster). Assigning an uncommissioned RF positioning node (e.g. luminaire) a set of location coordinates from the roster of undesignated RF positioning nodes (e.g., undesignated luminaire roster) removes that set of location coordinates from the roster of undesignated RF positioning nodes (e.g., undesignated luminaire roster).

The devices and techniques identify where uncommissioned RF positioning nodes (e.g., luminaires) are located within the indoor space or the outdoor space, and then automatically commission the uncommissioned RF positioning nodes (e.g., luminaires). The devices and techniques also cut down on manual installation time as well as require less effort and knowledge on the part of installers of the RF positioning node (e.g., luminaire-based) positioning system.

In an example, when commissioning the uncommissioned RF positioning nodes (e.g., luminaires), a technician first physically installs the uncommissioned RF positioning nodes. Then, the technician commissions a number of uncommissioned RF positioning nodes manually. Depending on the commissioning algorithms used and the topology of the space, the number of manually commissioned RF positioning nodes could be as low as one. A back-end computing device wirelessly polls for uncommissioned RF positioning nodes (e.g., luminaires) in the network, and observes many new RF positioning node (e.g. luminaire) identifiers from multiple newly-installed uncommissioned RF positioning nodes (e.g. luminaires). The back-end computing device then determines which of the multiple newly-installed uncommissioned RF positioning nodes (e.g., luminaires) correspond to which various physical location coordinates of undesignated RF positioning nodes (e.g. luminaires) in an automated protocol.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "luminaire-based positioning system" or "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below. FIG. 1A is a high-level functional block diagram of an example of a luminaire-based positioning system 100 of networks and devices that support automated initialization of a luminaire node map 125 of an indoor space (e.g., on premises) 105 and provide a variety of communications in support of determining a physical location 198 of a mobile device 199 of a user 197 in the indoor space 105. Although the example luminaire-based positioning system 100 is described for the indoor space 105, the luminaire-based positioning system 100 can be deployed in an outdoor space (e.g., using streetlights). As shown, luminaire-based positioning system 100 includes a plurality of luminaires 110A-Z located in the indoor space 105, such as a grocery store.

Each respective one of the luminaires 110A-Z includes a light source 111 and a driver circuit 112 coupled to the light source 111 to control a light source operation. The light source 111 may be virtually any type of light source suitable to providing the intended type of light output that may be electronically controlled. The light source 111, for example, may provide visible light output as providing visible illumination for human occupancy or the like and/or visible light source based positioning. The light source 111 may be of the same general type in all of the luminaires 110A-Z, e.g. all formed by some number of light emitting diodes (LEDs); although in many installations, some numbers of the luminaires 110A-Z may have different types of light sources 111, e.g. some use LEDs, some use compact or tube type fluorescent sources, etc. Thus, the light source 111 can include one or more organic light emitting diodes (OLEDs); one or more micro LEDs; one or more nanorod or nanowire LEDs; at least one fluorescent lamp; or at least one halogen lamp.

In the examples herein, the luminaires 110A-Z include at least one or more components forming a light source 111 for generating the artificial illumination light for a general lighting application as well as a local wireless network communication interface 113. In several illustrated examples, such luminaires 110A-Z may take the form of a light fixture, such as a pendant or drop light or a downlight, or wall wash light or the like. For example, luminaires 110A-Z include a pendant down light suspended/hanging from the ceiling, a 2×4 feet light fixture flush mounted on the ceiling, or sconces hung on the wall. Other fixture mounting arrangements are possible. For example, at least some implementations of the luminaire may be surface mounted on or recess mounted in a wall, ceiling or floor. The orientations of the luminaires 110A-Z and components thereof shown in the drawings and described below are by way of non-limiting examples only. The luminaires 110A-Z may take other forms, such as lamps (e.g. table or floor lamps or street lamps) or the like. Additional devices, such as fixed or controllable optical elements, may be included in the luminaire, e.g. to selectively distribute light from the illumination light source.

Each respective one of the luminaires 110A-Z further includes a luminaire local wireless network communication interface 113 configured for wireless communication over a local wireless communication network 106. In the example, the local wireless communication network 106 can be a wireless mesh network (e.g., ZigBee, DECT, NFC, etc.), a personal area network (e.g., Bluetooth or Z-Wave), a visual light communication (VLC) network, or Wi-Fi. A VLC network is a data communications variant which uses visible light between 400 and 800 THz (780-375 nm), and is a subset of optical wireless communications technologies.

Each respective one of the luminaires 110A-Z further includes a luminaire memory 114 and a luminaire processor 115 coupled to the driver circuit 112, the luminaire local wireless network communication interface 113, and the luminaire memory 114. As further shown in FIG. 5, the luminaire local wireless network communication interface 113 may include separate radios that operate at two different frequencies, such as a first wireless transceiver 113B at sub-GHz (e.g., 900 MHz), and a second wireless transceiver 113A at Bluetooth Low Energy (BLE 2.4 GHz). In some examples, the luminaire local wireless network communication interface 113 can operate at 5 GHz.

It should also be understood that the communication protocols over the local wireless communication network 106 may be varied, and thus may be via nLight® (commercially available from Acuity Brands Lighting), digital multiplex (DMX) control, Fresco® control network (FCN) (commercially available from Acuity Brands Lighting). FCN, DMX control, nLight®, and Z-Wave are lighting-centric networks that control a variety of luminaires 110A-Z. The WAN 130 is a separate network but with a shared application protocol for automated initialization. It should be appreciated, however, that local wireless communication network 106 and WAN 130 in a different implementation may be a different part of the same network tree or star network, and therefore may not be separate networks and can utilize the same network communication protocols. In some examples, the luminaire-based positioning system 100 can further include a secondary network 107 (e.g., wired or wireless), such as a backhaul network for communication between the luminaires 110A-Z and the gateway 120.

Luminaire-based positioning system 100 further includes a gateway 120. The gateway 120 is a device that provides access between a wide area network (WAN) 130 and the local wireless communication network 106. The WAN 130 (e.g., Internet) can be a cellular network, optical fiber, cable network, or satellite network that can be connected to via Ethernet, for example. The gateway 120 may provide routing, access, and other services for the luminaires 110A-Z residing at the indoor space 105, for example.

As shown in FIG. 3, the gateway 120 includes a gateway network communication interface system 121 including a gateway local wireless network communication interface 122A configured for wireless communication over the local wireless communication network 106. The gateway network communication interface system 121 further includes a gateway WAN communication interface 122B for communication over the WAN 130. The gateway 120 further includes a gateway memory 124 including a luminaire node map 125 of commissioned luminaires in the indoor space 105. The gateway 120 further includes a gateway processor 123 coupled to the gateway network communication interface system 121 and the gateway memory 124. The gateway 120 further includes gateway commissioning programming 128 in the gateway memory 124.

Luminaire-based positioning system 100 further includes a cloud computing device 166, and the cloud computing device 166 resides off-premises in the cloud 165 meaning the cloud computing device 166 is a remote server hosted on the Internet to store, manage, and process data, rather than the local gateway 120. As shown in FIG. 4, the cloud computing device 166 includes a cloud computing device wide area network (WAN) communication interface 167 configured for communication over a WAN 130. The cloud computing device 166 further includes a cloud computing device memory 169 and a cloud computing device processor 168 coupled to the cloud computing device WAN communication interface 167 and the cloud computing device memory 169. The cloud computing device 166 further includes cloud computing device commissioning programming 170 in the cloud computing device memory 169.

Gateway 120 is in communication with a cloud computing device 166 via the WAN 130 to automatically initialize the luminaire node map 125. In some examples, the gateway 120 is a conduit that sends collected data to the cloud computing device 166, which actually automatically initializes the luminaire node map 125. However, in another example, the cloud computing device 166 is not needed and the gateway 120 itself may automatically initialize the luminaire node map 125.

FIG. 1B is a schematic of the luminaire-based positioning system 100 of FIG. 1A showing that three of the luminaires 110A-W are commissioned luminaires 110U-W, and twenty of the luminaires 110A-T are uncommissioned luminaires 110A-T. There are also twenty undesignated luminaires 109A-T to which the twenty uncommissioned luminaires 110A-T will be associated. These twenty undesignated luminaires 109A-T are the same physical twenty uncommissioned luminaires 110A-T. The luminaire-based positioning system 100 has records of the twenty location coordinates 127A-T and separate records of the twenty uncommissioned luminaire identifier settings 126A-T, but does not yet have records of the association between a specific uncommissioned luminaire identifier setting 126A of a particular uncommissioned luminaire 109A and the specific location coordinates 127A of a particular undesignated luminaire 109A. Commissioning combines the luminaire identifier setting 126U and the location coordinates 127U into a single joined record, allowing the luminaire-based positioning system 100 to determine the luminaire identifier setting 126U of a commissioned luminaire 110U based off of the set of location coordinates 127U, and to determine the location coordinates 127U of a commissioned luminaire 110U based off of the luminaire identifier setting 126U. Therefore, commissioning combines the identity of a particular uncommissioned luminaire 109A with the identity of a particular undesignated luminaire 109A, resulting in a commissioned luminaire 109A. This process combines these identities: before commissioning, there are only twenty-three luminaires 109A-W installed in the indoor space 105. After commissioning, there are still only twenty-three luminaires 109A-W installed in the indoor space. The commissioning process is combining an identifier identity and a location identity into a single identity, comprising both a luminaire identifier 109A and a set of location coordinates 127A.

FIG. 1C is a luminaire node map 125 of the three commissioned luminaries 110U-W, generated in response to detecting the twenty uncommissioned luminaires 110A-T, as well as an undesignated luminaire roster 132 containing the coordinates of unidentified luminaires 109A-T that have yet to be associated with an uncommissioned luminaire 110A-T during the automated initialization process.

Generally described, the luminaire-based positioning system 100 includes a networked lighting system in which each luminaire 110A-Z is a networked node that can measure the received signal strength indicator (RSSI) of digital packet transmissions from other luminaires 110A-Z. That is, luminaire 110A can detect a signal from luminaire 110B and can associate an RSSI value (power reading) with that signal. Presuming also that the new uncommissioned luminaires 110A-T in the luminaire-based positioning system 100 have been physically installed, then the back-end computing device (e.g., gateway 120 and/or cloud computing device 166) of the luminaire-based positioning system 100 can implement the following functions.

First, the back-end computing device 120, 166 identifies the luminaire identifiers of the uncommissioned luminaires 110A-T by wireless polling. Either on command or on some schedule (e.g., at regular intervals), the back-end computing device 120, 166 polls the network for luminaire identifiers 109A-W, seeking those that are not already in the luminaire node map 125, such as luminaire identifiers 109A-T. Second, the back-end computing device 120, 166 collects RSSI measurements 136A-T and luminaire identifiers 110A-T from the already-mapped commissioned luminaires 110U-W that can detect a signal from each uncommissioned luminaire 110A-T. Either on command, on a schedule, or (preferably) when one or more new luminaire identifiers 110A-T are detected, the back-end computing device 120, 166 polls the network for RSSI measurements 136A-T: e.g., all commissioned luminaires 110U-W are ordered to report the originating luminaire identifiers 109A-T and corresponding RSSI measurements 136A-T of all packets received in a given interval of time. The back-end computing device 120, 166 then makes a list of commissioned luminaires 110A-T receiving packets from each uncommissioned luminaire 110A-T with corresponding RSSI measurements 136A-T. Commissioned luminaires 110U-W farther from each new uncommissioned luminaire 110A-T will tend to see lower RSSI measurements 136A-T for the respective uncommissioned luminaire 110A-T signal.

Third, the back-end computing device estimates the (x, y) coordinates of each uncommissioned luminaire 110A-T from the RSSI measurements 136A-T of the second step and the location coordinates of detecting luminaires as recorded in the luminaire node map 125. This estimate is based on the RSSI measurement 136A-T, when compared to a hypothetical RSSI measurement or projected RSSI value 137A-T from the uncommissioned luminaire 110A-T to the commissioned luminaires. Each projected RSSI value 137$x$ is stored and aggregated as a plurality of projected RSSI values 137A-T. These projected RSSI values 137A-T are theoretical RSSI measurements between every commissioned luminaire 109U-W and every uncommissioned luminaire 109A-T. For example, if an RSSI scale is between 0 and 100, experimental testing of a luminaire 109A-W may determine, on average, that the RSSI value decreases by 10 every 5 feet. This would be projecting RSSI measurements 137A-T by reducing a respective power level value of the commissioned luminaire 110U-W by a constant factor multiplied by a distance between that commissioned luminaire 110U-W and an undesignated luminaire 109A-T. Projected RSSI values 137$x$ can then be stored along with two pairs of coordinates: one for a commissioned node 110W, and one for an undesignated node 109T. Therefore, the luminaire-based positioning system 100 has a projected RSSI value for every pair of a commissioned luminaire 110U-W and an undesignated luminaire 109A-T. In this example if commissioned luminaire 109W and undesignated luminaire 109T are 10 feet apart, then their projected RSSI value would be 80. This estimate of 80 is stored in as a projected RSSI value 137$x$ in the plurality of projected RSSI values 137A-T. Additionally, in this example commissioned luminaire 110V and undesignated luminaire 109T are 22 feet apart (using the Pythagorean theorem to determine distance: $(20^2+10^2)^{1/2}$). The projected RSSI value 137$x$ between these two luminaires 110V, 109T is then 56. Therefore, when uncommissioned luminaire 110T reports an RSSI measurement 136$x$ of 80 from commissioned luminaire 110W, and an RSSI measurement 136$x$ of 56 from 110V, then the luminaire-based positioning system 100 determines which undesignated luminaires 109A-T have a projected RSSI value 137x of 80 from the commissioned luminaire 110W, as well as an RSSI measurement of 56 from the commissioned luminaire 110V. The undesignated luminaires 109A-T are then ranked based on the probability of having their associated projected RSSI values 137A-T match the actual RSSI measurement 136x of uncommissioned luminaire 110T. In this example, undesignated luminaire 109T is a perfect fit, and no other undesignated luminaire 109A-S could reasonably fit their projected RSSI values 137A-T to the RSSI measurements 136A-T. However, in practice, RSSI measurements 136A-T will likely have some variability when compared to projected RSSI values 137A-T. Various ranking algorithms and methods, including algorithms that commission multiple uncommissioned luminaires 110A-T at once, or commission uncommissioned luminaires 110A-T in cycles, or re-evaluate recently-commissioned luminaires 110A-T and re-commission those luminaires 110A-T, may all be implemented.

Fourth, the back-end computing device 120, 166 makes a safest-fit assignment of the uncommissioned luminaire 110A-T to undesignated luminaire positions 109A-T based on the ranking of the matching probabilities between a given uncommissioned luminaire 110A-T and a given undesignated luminaire 109A-T, thus "automatically initializing" the luminaire node map 125 by creating an adjusted luminaire node map 225.

A system of comparing RSSI measurements between two sets of coordinates (a commissioned luminaire 110W and an undesignated node 109T) can have advantages over using a simple distance and direction estimate. RSSI measurements are known to be materially affected by the environment, and in particular conductive and impeding objects nearby can increase or decrease RSSI measurements without changing the distance and direction between two sets of coordinates. However, if the RSSI measurement already factors in these material changes, then a more accurate fit can be determined. This process can be performed by having the luminaire node map 121 further comprise one or more fixed objects with a known radio signal impedance 118A. Additionally, the plurality of projected RSSI values 137A-T projects a projected RSSI value by reducing the power level value, or RSSI value, of a commissioned luminaire 110U-W by a constant factor multiplied by the distance between that commissioned luminaire 110U-W and the undesignated luminaires 109A-T, and then further reducing that power level by the known radio signal impedance of the one or more fixed object 118A with a known radio signal impedance that a projected radio signal passes through from the undesignated luminaire 109A-T to the commissioned luminaire 110U-W.

For example, if it is known that a brick wall is between undesignated luminaire 109T and commissioned luminaire 110W, and that brick walls decrease RSSI values by 5, then the projected RSSI value between undesignated luminaire 109T and commissioned luminaire 110W would be 75 rather than 80. Then, when uncommissioned luminaire 110T and commissioned luminaire 110W have a measured RSSI measurement of 75, the uncommissioned luminaire 110T will still be matched with undesignated luminaire 109T. In a purely distance-based assessment, the RSSI values used to determine distance will lead the luminaire-based positioning system 100 to believe that uncommissioned luminaire 110T is 15 feet from commissioned luminaire 110W, and still 22 feet from commissioned luminaire 110V. The luminaire-based positioning system might then combine undesignated luminaire 109S with uncommissioned luminaire 110T, after determining that 20 feet to commissioned luminaire 110W and 28 feet to commissioned luminaire 110V is the closest, best, or safest fit. This would then result in an incorrect initializing commissioning, because uncommissioned luminaire 110T is physically at the set of location coordinate 127T of undesignated luminaire 109T, and not at the set of location coordinates 127S of undesignated luminaire 109S. Incorrect commissioning not only requires correction, possibly including manual correction, but also propagates further incorrect commissioning of other uncommissioned luminaires 110A-S, as other uncommissioned luminaires 110A-S such as uncommissioned luminaire 110O has incorrect information about where commissioned luminaire 110T is physically, due to commissioned luminaire 110T being recorded at the set of location coordinates 127S and not the set of location coordinates 127T.

In some examples, one or three-dimensional coordinates are used for the multiple sets of location coordinates 127A-W instead of two-dimensional coordinates—there is no restriction to planar arrays. Data other than or additional to RSSI measurements are used in position estimation, such as the multiple sets of commission location coordinates 127A-W. RSSI and/or other measurements by ancillary devices such stationary or non-luminaire mobile device 199 are used in position estimation. RSSI and other measurements made by the luminaires themselves are used in position estimation. Various geometric position-estimation algorithms use the positional data to estimate the coordinates of individual replacement luminaires. Various algorithms are used to assign luminaire identifiers to the multiple sets of commissioned location coordinates 127A-W to produce a "best fit." Various iterative algorithms are used to refine commissioned luminaire assignments.

In the discussion of FIGS. 1B-C below, functions are divided in the luminaire-based positioning system 100, such that the gateway 120 initially detects which of the luminaires 110A-W are commissioned luminaires 110U-W; and uncommissioned luminaires 110A-T, and undesignated luminaires 109A-T. Next, the gateway 120 then sends to the cloud computing device 166: (i) a respective uncommissioned luminaire identifier 110A-T, (ii) a neighboring commissioned luminaire list 135A-T, (iii) a respective RSSI measurement 136A-T, and (iv) the projected RSSI values 137A-T; (b) the luminaire node map 125; (c) an uncommissioned luminaire list 131; and (d) the undesignated luminaire roster 132. For example, the four data parameters (i), (ii), (iii), and (iv) are collectively aggregated into a JavaScript Object Notation (JSON) format file, which is then sent from the gateway 120 to the cloud computing device 166. Finally, the cloud computing device 166 then performs the remainder of the processing to adjust the luminaire node map 125 and then sends the adjusted luminaire node 225 map back to the gateway 120.

Initially, execution of the gateway commissioning programming 128 by the gateway processor 123 configures the gateway 120 to implement the following functions. Gateway 120 receives, via the gateway local wireless network communication interface 122A, a respective uncommissioned luminaire identifier 110A-T from a plurality of uncommissioned luminaires 110A-T in the indoor space 105. Gateway 120 stores the respective uncommissioned luminaire identifier 110A-T of the uncommissioned luminaires 110A-T in an uncommissioned luminaire list 131. Gateway 120 sends, via the gateway local wireless network communication interface 122A, a scan request message 133A-T to each uncommissioned luminaire 110A-T requesting a scan response message 134A-T.

As described herein, a neighboring commissioned luminaire is adjacent or relatively close enough in proximity to an uncommissioned luminaire 110A-T to enable direct radio frequency (RF) communication or visible light communication (VLC) communication between the neighboring commissioned luminaire 110U-W and the uncommissioned luminaire 110A-T to allow a direct RSSI measurement to be taken between the neighboring commissioned luminaire 110U-W and the uncommissioned luminaire 110A-T. The farther the uncommissioned luminaire 110A-T is from the neighboring commissioned luminaire 110U-W, the lower the direct RSSI measurement becomes. However, in some examples, an RSSI measurement threshold may be used to screen out a neighboring commissioned luminaire 110U-W that can directly communicate with the uncommissioned luminaire 110A-T, but has a RSSI measurement with a value below the RSSI measurement threshold, and is practically speaking too far away.

In the example of FIGS. 1B-C, for uncommissioned luminaire 110T, the neighboring commissioned luminaires and the received commissioned luminaire identifiers are 110W and 110V. For uncommissioned luminaire 110J, the neighboring commissioned luminaires and the received commissioned luminaire identifiers are 110U, and 110V. For uncommissioned luminaire 110O, the neighboring commissioned luminaires and the received commissioned luminaire identifiers are 110W, and 110V.

In response to sending the scan request message 133A-T to each uncommissioned luminaire 110A-T, the gateway 120 receives from each of the uncommissioned luminaires 110A-T the scan response message 134A-T including: (i) the respective uncommissioned luminaire identifier 110A-T, (ii) a neighboring commissioned luminaire list 135A-T of commissioned luminaire identifiers of neighboring commissioned luminaires. The scan response message 134A-T further includes: (iii) a respective received signal strength indicator (RSSI) measurement 136A-T of the uncommissioned luminaire to each of the neighboring commissioned luminaires. For example, for uncommissioned luminaire 110T, RSSI measurements 136V-W are received for neighboring commissioned luminaires 110V and 110W, respectively. The scan request message 133A-T message does not need to be sent by the gateway 120. The uncommissioned luminaires 110A-T could be responsible for initiating scans on their own (e.g., periodically). The signal strength indicator is not limited to RSSI and could be other types of signal strength indicia.

In response to receiving from each of the uncommissioned luminaires 110A-T the scan response message 134A-T, the gateway 120 sends, via the gateway WAN communication interface 122B, to the cloud computing device 166: (a) (i) the respective uncommissioned luminaire identifier 110A-T, (ii) the neighboring commissioned luminaire list 135A-T, (iii) the respective RSSI measurement 136A-T, and (iv) the projected RSSI values 137A-T; (b) the luminaire node map 125; (c) the uncommissioned luminaire list 131; and (d) the undesignated luminaire roster 132.

By sending (a POST call) all four lists mentioned above are aggregated in one JSON file. The JSON file is a file that stores simple data structures and objects in JavaScript Object Notation (JSON) format, which is a standard data interchange format that can be used to transmit data between the gateway commissioning programming 128 (e.g., a web application running on gateway 120) and the cloud computing device commissioning programming 170 (e.g., a server running on cloud computing device 166). The cloud computing device commissioning programming 170 can be structured as a microservice—a software development technique that is a variant of the service-oriented architecture (SOA) architectural style that structures an application as a collection of loosely coupled services, where the services are fine-grained and the protocols are lightweight.

Next, execution of the cloud computing device commissioning programming 170 by the cloud computing device processor 168 configures the cloud computing device 166 to implement the following functions. For each of the uncommissioned luminaires 110A-T in the uncommissioned luminaire list 132, cloud computing device 166 calculates a respective RSSI match probability 171A-T between an uncommissioned luminaire 110A-T to each of the neighboring commissioned luminaires 110U-W based on the respective RSSI measurement 136A-T and the plurality of projected RSSI values 137A-T of each of the neighboring commissioned luminaires 110U-W to neighboring undesignated luminaires 109A-T. The lower the RSSI measurement 136A-T, generally the greater the respective distance between the neighboring commissioned luminaire 110U-W and the uncommissioned luminaire 110A-T. Therefore in some embodiments, RSSI measurements 136A-T are not compared to projected RSSI values 137A-T, but rather estimated distances based off of RSSI measurements 136A-T are compared to estimated distances. However, in some specific examples lower RSSI values do not indicate lower distances, such as when an inductive object is in the path between two luminaires. In those examples it can be better to use RSSI value comparison to determine match probability 171A-T.

For each of the uncommissioned luminaires 110A-T in the uncommissioned luminaire list 132, based on the calculated respective RSSI measurement match probability 171A-T to each of the neighboring commissioned luminaires and the set of commissioned location coordinates of each of the neighboring commissioned luminaires, cloud computing device 166 selects a set of undesignated location coordinates 127A-T to associate with each of the uncommissioned luminaires 110A-T. This is one way of selecting the set of undesignated location coordinates 127A-T. In some examples, selecting the set of undesignated location coordinates 127A-T of the uncommissioned luminaire 110A-T includes: removing neighboring commissioned luminaires 110U-W from the neighboring commissioned luminaire list 135A-T based on the respective signal strength indicator measurement being weak (e.g. below a threshold value); and estimating a set of undesignated location coordinates 127A-T for the uncommissioned luminaire 110A-T by calculating a centroid between remaining neighboring commissioned luminaire list 135A-T.

Finally, cloud computing device 166 determines an assignment of the undesignated location coordinates 127A-T of the safest undesignated luminaire 109T of the undesignated luminaires 109A-T in the undesignated luminaire roster 132 to a set of uncommissioned location coordinates 127T of the respective uncommissioned luminaire 110T. However, the automated initialization can proceed even if a first number of uncommissioned luminaires 110A-T is less than a second number of undesignated luminaires 109A-T or vice versa. An example scenario would be where there are twenty-three locations for luminaires 110A-W, but the technician only installs fifteen luminaires 110A-O. This would result in twenty-three undesignated luminaires 109A-W, as any of those positions are valid locations the technician could have installed luminaires 110A-O; and fifteen uncommissioned luminaires 110A-O, because only fifteen luminaires were installed.

A safest fit could be determined by a variety of algorithms: at a basic level, the safest fit could be the pair of undesignated luminaire 109A-T and uncommissioned luminaire 110A-T that has the closest RSSI values, which would be a best fit. Alternatively, the safest fit could be the pair of undesignated luminaire 109A-T and uncommissioned luminaire 110A-T that is least-worst. Selecting the least-worst fit means selecting the pair of undesignated luminaire 109A-T and uncommissioned luminaire 110A-T that have the comparatively worst first alternative matches. For example, if undesignated luminaire 109T and uncommissioned luminaire 110T have a 99% match probability, undesignated luminaire 109O and uncommissioned luminaire 110T have a 95% match probability, undesignated luminaire 109O and uncommissioned luminaire 110O have an 80% match probability, and undesignated luminaire 109O and uncommissioned luminaire 110J have a 30% match probability, the safest fit is to match undesignated luminaire 109O and uncommissioned luminaire 110O. The alternative fit for uncommissioned luminaire 110T is very close to the best fit: the difference between 99% and 95% is only 4%: this difference could be explained by local interference. However, the alternative fit for uncommissioned luminaire 110O 50% lower than the best fit: it is more unlikely that local interference is causing the match between undesignated luminaire 109O and uncommissioned luminaire 110O to be off by more than 50%, which would need to be true for the alternative fit to be the correct fit. Therefore, the least-worst fit is to match undesignated luminaire 109O and uncommissioned luminaire 110O. This has the added benefit of removing undesignated luminaire 109O from the match probability list for undesignated luminaire 109T, making the selection of the safest fit for undesignated luminaire 109T easier. These methods may be combined, may be applied across all or a subset of other luminaires 110A-W, and the comparison of varying match percentages may be performed in more complex calculation to improve accuracy.

Cloud computing device 166 sends, via the cloud computing device WAN communication interface 167, to the gateway 120 the adjusted luminaire node map 225. For example, the adjusted luminaire node map 225 is sent from the cloud computing device 166 to the gateway 120 as a JSON format file.

It should be noted that in some examples determining the safest fit assignment of the set of undesignated luminaires 109A-T in the undesignated luminaire roster 132 can further include reassigning the commissioned luminaires 110U-W in the luminaire node map 125 that were previously incorrectly assigned to the set of commissioned location coordinates 127U-W.

It is possible that a given uncommissioned luminaire 110A-T has a closest match to more than one undesignated luminaire 109A-T. In this case, since more than one uncommissioned luminaire 110A-T cannot occupy one set of location coordinates 127A-T, a tie-breaking algorithm can be used.

Subsequently, execution of the gateway commissioning programming 128 by the gateway processor 123 configures the gateway 120 to implement the following functions. Gateway 120 receives, via the gateway WAN communication interface 122B, from the cloud computing device 166 the adjusted luminaire node map 225. Gateway 120 replaces the luminaire node map 125 with the adjusted luminaire node map 225. After replacing the luminaire node map 125 with the adjusted luminaire node map 225, the gateway 120 can determine a physical location 198 of a mobile device 199 of a user 197 in the indoor space 105 based on the adjusted luminaire node map 225.

Functions in the luminaire-based positioning system 100 can be divided (i.e., distributed) differently. For example, the processing to adjust the luminaire map 125 may be performed entirely on the gateway 120 or luminaires 110A-W. Hence, gateway 120 can perform all or a subset of any of the functions described as a result of the execution of the gateway commissioning programming 128 in the gateway memory 124 by the gateway processor 123 of the gateway 120. Cloud computing device 166 can perform all or a subset of any of the functions described as a result of the execution of cloud computing device automated initialization 170 in cloud computing device memory 169 by the cloud computing device processor 168 of the cloud computing device 166. Luminaires 110A-W can perform all or a subset of any of the functions described as a result of the execution of luminaire commissioning programming 116 in luminaire memory 114 by the luminaire processor 115 of the luminaires 110A-W.

In a first example, the cloud computing device 166 is eliminated from the luminaire-based positioning system 100 and the gateway 120 performs the automated initialization functions that were implemented on the cloud computing device 166. Execution of the gateway commissioning programming 128 by the gateway processor 123 configures the gateway 120 to implement the following functions. In response to sending the scan request message 133A-T to each uncommissioned luminaire 110A-T, gateway 120 calculates a respective RSSI match probability 171A-T between an uncommissioned luminaire 110A-T to each of the neighboring commissioned luminaires 110U—W based on the respective RSSI measurement 136A-T and the plurality of projected RSSI values 137A-T of each of the neighboring commissioned luminaires 110U-W to neighboring undesignated luminaires 110A-T. Further in response to sending the scan request message 133A-T to each uncommissioned luminaire 110A-T, based on the calculated respective RSSI measurement match probability 171A-T to each of the neighboring commissioned luminaires and the set of commissioned location coordinates of each of the neighboring commissioned luminaires, gateway 120 selects a set of undesignated location coordinates 127A-T to associate with each of the uncommissioned luminaires 110A-T. Gateway 120 determines an assignment of the undesignated location coordinates 127A-T of the safest undesignated luminaire 109T of the undesignated luminaires 109A-T in the undesignated luminaire roster 132 to a set of uncommissioned location coordinates 127T of the respective uncommissioned luminaire 110T. Gateway 120 adjusts the luminaire node map 125 for each set of the location coordinates 127A-T of the undesignated luminaires 109A-T based on the determined safest fit assignment by adding a new set of commissioned location coordinates 127A-T stored in association with the respective uncommissioned luminaire identifier 110A-T that most safely fit the set of undesignated location coordinates 127A-T.

Depending on the geometry of a given indoor space 105 and layout of an array of the luminaires 110A-Z, there can be some limit on the number of new uncommissioned luminaires 110A-T accommodated. That is, there can be too few commissioned luminaires 110U-W with known location coordinates 127U-W making RSSI measurements 136A-T to enable estimation of the locations of the new uncommissioned luminaires 110A-T. On the other hand, in some arrays whose M luminaires 110A-W have known (x, y) locations, matrix methods and mutual RSSI measurements 136A-T can be used to derive a safest fit assignment of any number of luminaires up to and including M. This is possible (in cases) because purely mutual signal measurements of luminaires 110A-W having initially unknown locations can contain spatial information: e.g., for a large planar luminaire array of all-new luminaires 110A-W, luminaires 110A-W that detect more neighbors are probably interior to the array while those that detect fewer neighbors are probably at or near its edges. Depending on array geometry, therefore, it is possible to completely bootstrap a luminaire node map 125. All such approaches are contemplated.

Additionally, the gateway memory 124 or cloud computing memory 169 may contain one or more alternative luminaire node maps 325. The alternative luminaire node map 325 may look similar to the adjusted node map 225 of FIG. 2B. These alternative luminaire node maps 325 are node maps that are calculated or derived based off of the physical features of the indoor space 105, or based off of the physical features of a similar indoor space. For example, a building floorplan may allow determining radio impedance of walls and permanent fixtures, but cannot assist with more temporary structures like shelving, or features not on the floorplan, such as metal piping or air conditioners on the roof. However, by using an alternative luminaire node map 325 from a similar indoor space, projected RSSI values 137A-T can be determined by comparing actual RSSI measurements 136A-T in similar location coordinates 127A-W in the luminaire node map 125 and the alternative luminaire node map 325. Similar location coordinates 127A-W could have similar absolute positions on both maps 125, 325, or they could be similar based on features on both maps 125, 325. For example, the front-left corner of two maps 125, 325 have the same absolute position. The position in the center of a freezer section of a grocery store, even if both maps 125, 325 are laid out differently, have the same relative position (relative to the freezer section). Furthermore, similarity could be determined based on comparable relative changes on both maps 125, 325. The alternative luminaire node map 325 may indicate that RSSI measurements 136A-E,U generally decrease going from the left side of the alternative luminaire node map 325 to the right side of the alternative luminaire node map 325 along the bottom face of the alternative luminaire node map 325. If the luminaire node map 125 appears to be exhibiting, along the top face of the node map 125, a decrease in RSSI measurements 136P-T,W, the similar left-to-right decreasing behavior may be detected and applied to the adjusted luminaire node map 225 during the commissioning process. The similar left-to-right decreasing behavior may be detected even though in the alternative luminaire node map 325 the behavior occurs along the bottom of the alternative luminaire node map 325, while the behavior appears to be occurring across the top of the luminaire node map 125. Both relative and absolute behavior can be detected, and the behavior can be more complex than a simple gradient: the graph of RSSI measurements 136A-T when depicted as vectors may look similar to a magnetic vector field with multiple magnetic objects.

Therefore, the process of using a luminaire node map 125 and an alternative luminaire node map 325 to determine projected RSSI values 137A-T in order to calculate the adjusted luminaire map 225 may require vector comparison rather than coordinate comparisons. For example, looking at FIG. 1D, there is the luminaire node map 125 shown in the format of a grid map. Below is a comparable alternative luminaire node map 325 shown in the format of a grid map. The alternative luminaire node map 325 in this example is of a similar indoor space 105, which was manually set up, so it may be presumed there are few to no errors in this map 325. To determine the projected RSSI value 137G between luminaire 110F and 110G, the luminaire-based positioning system 100 looks at the alternative luminaire node map 325, at the equivalent alternative luminaires 196F and 196G. If the RSSI measurement 136G between alternative luminaires 196F and 196G is, for example, 87, then 87 is the projected RSSI value 137F between luminaires 110F and 110G. Therefore, the plurality of projected RSSI values 137A-T will include a projected RSSI value 137G of 85 between commissioned luminaire 110F and undesignated luminaire 109G. The projected RSSI value 137G is included once luminaire 110F is commissioned, and when attempting to commission uncommissioned luminaries 110A-T that may be in undesignated luminaire 109G, the value of 87, which is the alternative projected RSSI value 137G, will be used for RSSI comparison rather than a calculated value. This alternative projected RSSI value 137G may be combined with a calculated value, or can be otherwise modified either procedurally or based on known differences between the indoor space 105 of the luminaire node map 125 and that of the alternative luminaire node map 325. One way to handle distinctions is to utilize the vector comparisons. In FIG. 1D, the luminaire node map 125 has an impeding object 18B between luminaires 110A-B, and 110F-G. This impeding object 18B will materially affect RSSI measurements near the impeding object 18B. In the alternative luminaire node map 325, the impeding object 18C is in a different location, near alternative luminaires 196C-D and 196 H-I. Because of this, alternative luminaire node map 325 is not immediately an accurate predictor of RSSI values on luminaire node map 125: The values between luminaire 110A and 110G will be much lower than between alternative luminaire 196A and 196G, while the values between luminaire 110C and 110I will be much higher than the values between alternative luminaire 196C and 196I. However, if the impeding objects 18B-C are known, then projected RSSI values 137A-D,F-I relative to the impeding objects 18B-C can be used. Meaning, rather than determining RSSI values from (1,1) to (2,2) with respect to the origin of luminaire node map 125 and alternative luminaire node map 325, the luminaire-based positioning system 100 can determine RSSI values from (−0.5, −0.5) to (0.5, 0.5)) relative to the impeding objects 18B-C. When using this methodology, the luminaire node map 125, knowing the position of the impeding object 18B, can determine appropriate projected RSSI values 137A-B, F-G for luminaires 110A-B, 110F-G that must pass through or close to the impeding object. Rather than compare luminaire 110A to luminaire 196A, and luminaire 110G to luminaire 196G, comparison from luminaire 110A to luminaire 196C and luminaire 110G to luminaire 196I can instead be performed, since both routes between those pairs pass through their respective impeding objects 18B-C.

Therefore, in these examples, the gateway memory 124 further includes one or more alternative luminaire node maps 325, and one or more plurality of alternative projected RSSI values 137A-T, including an alternative projected RSSI value 196I between an alternative sender luminaire 196C and an alternative receiver luminaire 196I, and an alternative vector with a magnitude and direction based on an origin 127C at the sender luminaire 196C and a terminal point 127I at the receiver luminaire 196I. The projected RSSI values 137A-T are used to create an initial vector with a magnitude and direction based on an origin 127C at the commissioned luminaire 110C and a terminal point 127I at the undesignated luminaire 109I. Gateway commissioning programming 128 also configures the gateway 120 to, based on the initial vector, assign the projected vector that has the safest fit. This programming is similar to the previous method utilizing location coordinates: the difference is that using vectors allows for relative positioning comparisons, rather than absolute positioning comparisons. This increases interoperability of similar but not identical luminaire node maps 125 and alternative luminaire node maps 325. Machine learning methods may be used to improve both the coordinate-based matching and vector-based matching methods, allowing for more robust automatic initialization processes as more alternative luminaire node maps 325 are collected. The gateway 120 may also calculate a respective vector match probability between the initial vector and each alternative vector based on the direction and magnitude of the initial vector and the direction and magnitude of each of the alternative vectors, and based on the calculated respective vector match probability to each of the alternative vectors and the initial vector, select an alternative RSSI measurement to associate with the projected RSSI value 137*x*. The cloud computing device 166 is also capable of implementing this vector-based approach.

FIG. 2A is a schematic of the luminaire-based positioning system of FIG. 1A that includes a visual layout of twenty-three commissioned luminaires 110A-W after automated commissioning has occurred, as represented by a respective set of location coordinates 127A-W. As shown, the respective set of location coordinates 127A-W are located on a two-dimensional Cartesian coordinate system, which includes an X axis for horizontal (e.g., lateral) coordinate position and a Y axis for a vertical coordinate position (e.g., longitudinal). In the example of FIG. 2A, all of the twenty-three initially commissioned luminaires 110A-W are in an operational state. An X location coordinate component of the respective set of location coordinates 127A-W ranges from 1 to 6 in the example, and the Y location coordinate component of the respective set of location coordinates 127A-W ranges from 1 to 4. The X location coordinate and the Y location coordinate cover the entire floor area of the indoor space 105, but do not identify the height of the luminaire 110A-W (e.g., a Z axis component).

Figure 2B:
FIG. 2B is an adjusted luminaire node map of the luminaire-based positioning system of FIG. 2A depicted in a table format.

Mobile device 199 of the user 197 (e.g., a human or a robot) can be a smartphone, tablet computer, wearables (e.g., hearing aid, Google Glass, smart watch, or implantables), or laptop/personal computer. In the example of FIGS. 1A and 2B, luminaires 110A-W communicate with the mobile device 199 of the user and the gateway 120 to determine a physical location 198 of the user 197 in the indoor space 105. Generally, the luminaire-based positioning system 100 determines an initial position in the indoor space 105, shown as physical location 198, of the mobile device 199 based on several received signal strength indicator (RSSI) data communication measurements (e.g., Bluetooth or WiFi) to three or more commissioned luminaires 110A-W. The farther the mobile device 199 is from the commissioned luminaires 110A-W, the lower the respective RSSI data communication measurement becomes. Since the set of commissioned location coordinates 127A-W of the commissioned luminaires 110A-W are all known, the RSSI measurements are the triangulated and/or trilaterated to calculate the physical location 197A of the mobile device 199 of the user within the indoor space 105. As shown in the specific example of FIG. 2A, the user travels through the indoor space 105 carrying the mobile device 199 to three different physical locations 198A-C. As the physical location 198A-C of the mobile device 199 changes, different commissioned luminaires 110A-W are used to take the RSSI measurements. The known sets of commissioned location coordinates 127A-W of those commissioned luminaires 110A-W and RSSI measurements are then used to calculate the physical location 198A-C of the mobile device 199 using triangulation and/or trilateration. This is one is just one possible use of a commissioned set of luminaires 110A-W as the RF positioning nodes. The commissioned luminaires 110A-W could be streetlights in an outdoor space, which are dimmed on or off. In some examples, the RF positioning nodes are BLE wireless beacons or other wireless RF devices. For example, this automated initialization technique could be used with wireless beacons that are not luminaires. As another alternative, the automated initialization technique can be used with luminaires, but not in a positioning system, and instead where the physical location coordinates of the luminaires is needed to set up zones for dimming of a lighting system.

For the physical location 198A, the RSSI measurements taken are between the mobile device 199 and commissioned luminaires 110A, 110B, 110F, and 110G and the physical location 197A is triangulated and/or trilaterated to the sets of commissioned location coordinates 127A, 127B, 127F, and 127G. For the physical location 198B, the RSSI measurements taken are between the mobile device 199 and commissioned luminaires 110G, 110H, 110L, and 110M and the physical location 197B is triangulated and/or trilaterated to the sets of commissioned location coordinates 127G, 127H, 127L, and 127M. For the physical location 198C, the RSSI measurements taken are between the mobile device 199 and commissioned luminaires 110K, 110L, 110P, and 110Q and the physical location 197C is triangulated and/or trilaterated to the sets of commissioned location coordinates 127K, 127L, 127P, and 127Q.

Because the gateway 120 has the luminaire node map 125, the calculation of the physical location 198A-C of the mobile device 199 is implemented on gateway 120. Thus, the mobile device 199 is in communication with the gateway 120 via the local wireless communication network 106. However, in some examples, if the commissioned luminaires 110A-W include the luminaire node map 125, then the calculation of the physical location 198A-C of the mobile device 199 can be implemented in the luminaires 110A-W. In yet another example, the mobile device 199 itself implements the calculation of the physical location 198A-C. For example, the mobile device 199 includes the luminaire node map 125 and the luminaire-based positioning application 650 (see FIG. 6) loaded in memory 640A-B. The luminaire-based positioning application 650 of mobile device 199 is executed by the CPU 630 to calculate the physical location 198A-C of the mobile device 199. In a final example, the mobile device 199 may be in communication with the cloud computing device 166 via the gateway 120, and the cloud computing device 166 calculates the physical location 198A-C of the mobile device 199, which is sent back to the mobile device 199 via the gateway 120 over the local wireless communication network 106.

Although the RSSI measurements are based on radio frequency (RF) waves, in some examples different ranges in the electromagnetic spectrum can be used for positioning of the mobile device 199. Thus alternatively, visible light modulation of the light source 111 of the luminaires 110A-Z, for example, as disclosed in U.S. Pat. No. 9,287,976; titled "Independent Beacon Based Light Position System," issued Mar. 15, 2016 can be used for positioning the mobile device 199. The calculation of the physical location 198A-C in the indoor space 105 using VLC light waves is similar to RF waves—triangulation and/or trilateration of the RSSI measurements between the mobile device 199 to three or more commissioned luminaires 110A-W whose sets of commissioned location coordinates 127A-W are known is used. For example, the light source 111 may be coupled to a light modulator for visible light communication (VLC). VLC technologies for indoor positioning in the indoor space 105 to determine the position of a mobile device 199 carried by a user 197 are available from Qualcomm Inc. under the trade name Lumicast™. VLC can be done by having luminaires 110A-Z output oscillating light (e.g., projection of a barcode) in combination with the illumination space lighting.

FIG. 2B is the luminaire node map 125 of the luminaire-based positioning system 100 of FIG. 2A depicted in a table format. Each of the twenty-three commissioned luminaires 110A-W is assigned a commissioned luminaire position 1-23 in the adjusted luminaire node map 225 ranging from one to twenty-three. The twenty-three positions cover the entire area of the indoor space 105 for which positioning of the mobile device 199 of the user is 197 is desired. As shown, the commissioned luminaire identifier settings 126A-W store luminaire identifiers 110A-W. The set of commissioned location coordinates 127A-W include two components: an X location coordinate and a Y location coordinate for each of the commissioned luminaires 110A-W.

The adjusted luminaire node map 225 has multiple commissioned luminaire identifier settings 126A-W, including a respective commissioned luminaire identifier setting 126A-W of each commissioned luminaire 110A-W in the indoor space 105. The adjusted luminaire node map 225 also has multiple sets of commissioned location coordinates 127A-W. Each set of commissioned location coordinates 127A-W is stored in association with the respective commissioned luminaire setting 126A-W. A two-dimensional Cartesian coordinate system is used in the example adjusted luminaire node map 225 for each of the sets of commissioned location coordinates 127A-T. However, a three-dimensional coordinate system can be used which includes an additional component along a Z axis for depth or height measurement. For example, if the indoor space 105 is a grocery store it can be advantageous to know whether the mobile device 199 is at floor level or near or at the ceiling level. A grocery store aisle may include several objects of interest, such a cereal boxes stacked on top of various shelves of an aisle, in which case only knowing the X location coordinate and the Y location coordinate is useful, but also knowing the Z location coordinate is even more useful.

FIG. 2C is an isometric view of a luminaire 110A mounted in the indoor space 105. In the example of FIG. 2C, the drop light fixture type luminaire 110A was hung below the ceiling by multiple support rods or cables attached to a number of brackets on the luminaire 110A. The example of FIG. 2C represents a pendant type light fixture implementation of the luminaire 110A in which the fixture has a bracket on a surface opposite the artificial illumination lighting output, providing an attachment point for a single strut attached to or through the ceiling. Other aspects of structure, orientation and operation of the luminaire 110A are generally similar to those of the luminaires 110A-W discussed herein. Location of electronics should be decided (e.g. in ceiling or on fixture) size and weight considerations, since fixture weight may be an issue. For example, the electronics of the lighting device may be in the suspended luminaire portion or included in or near the support structure in our above the ceiling to reduce the weight held below the ceiling by the support(s) and bracket(s).

FIG. 3 is a block diagram of a gateway 120 that communicates via the luminaire-based positioning system 100 of FIGS. 1A-B and 2A. As previously described in FIGS. 1A-B and 2A, the gateway 120 includes the gateway network communication interface system 121, the gateway processor 123, and the gateway memory 124. Gateway memory 124 of FIG. 3, cloud computing device memory 169 of FIG. 4, and luminaire memory 114 of FIG. 5 each include memories/storage, such as a random access memory and/or a read-only memory to store data, as well as programs stored in one or more of the memories/storage. As shown in FIG. 3, the gateway memory 124 can, for example, store the luminaire node map 125, uncommissioned luminaire list 131, undesignated luminaire roster 132, scan request messages 133A-T, scan response messages 134A-T, projected RSSI values 137A-T, and alternative luminaire node maps 325. Gateway memory 124 also stores gateway commissioning programming 128, which, when executed by the gateway processor 123, reads the luminaire node map 125 as input, and then implements automated initialization of the adjusted luminaire node map 225 as outlined in, for example, FIGS. 2A-B above.

Figure 5:
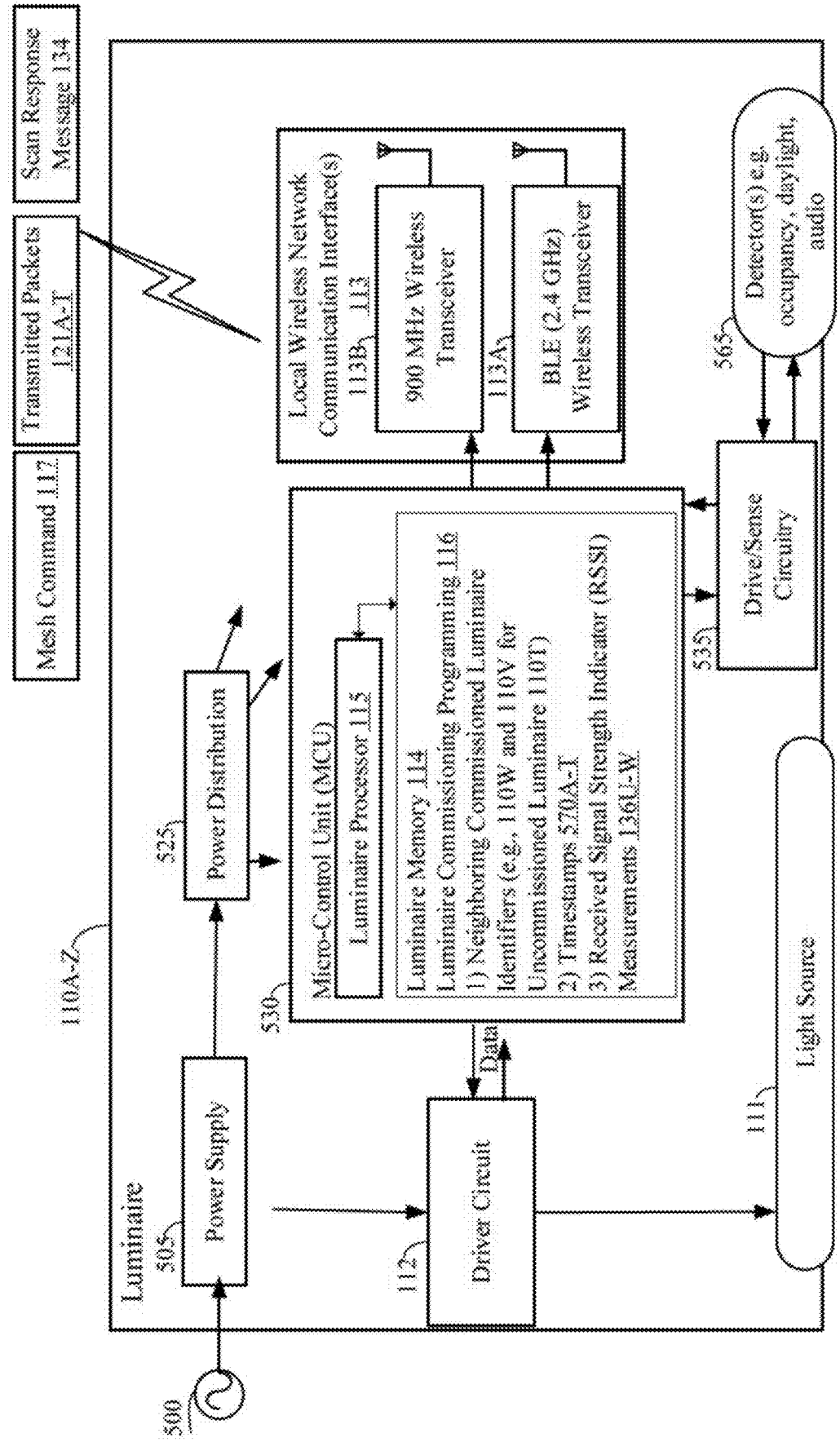
FIG. 5 is a block diagram of a luminaire that communicates via the luminaire-based positioning system of FIGS. 1A-B and 2A.

Gateway processor 123 of FIG. 3, cloud computing device processor 168 of FIG. 4, and luminaire processor 115 of FIG. 5, each include a central processing unit (CPU), shown by way of example as a microprocessor (μP), although other processor hardware may serve as the CPU. The CPU and memories, for example, may be implemented by a suitable system-on-a-chip often referred to as a micro-control unit (MCU). In a microprocessor implementation, the microprocessor may be based on any known or available microprocessor architecture, such as a Reduced Instruction Set Computing (RISC) using ARM architecture, as commonly used today in mobile devices and other portable electronic devices. Of course, other microprocessor circuitry may be used to form the gateway processor 123, cloud computing device processor 168, and luminaire processor 115, which can include one or more cores. Although the illustrated examples of gateway processor 123, cloud computing device processor 168, and luminaire processor 115 include only one microprocessor, for convenience, a multi-processor architecture can also be used.

FIG. 4 is a block diagram of a cloud computing device 166 that communicates via the luminaire-based positioning system 100 of FIGS. 1A-B and 2A. As previously described in FIGS. 1A-B and 2A, the cloud computing device 166 includes the cloud computing device WAN communication interface 167, the cloud computing device processor 168, and the cloud computing device memory 169. As shown, the cloud computing device memory 169 can, for example, store the luminaire node map 125, uncommissioned luminaire list 131, undesignated luminaire roster 132, collected data from scan response messages 134A-T, projected RSSI values 137A-T, calculated match probabilities 171A-T, the adjusted luminaire node map 225 and alternative luminaire node maps 325. Cloud computing device memory 169 also stores cloud computing device commissioning programming 170, which, when executed by the cloud computing device processor 168, reads the luminaire node map 125 as input in block A, and then implements automated initialization of the luminaire node map 125 as outlined in, for example, FIGS. 1A-C above.

Although described in terms of luminaires 110A-W and an indoor space 105 (e.g., on premises), the luminaires 110A-W are just one example of a deployment environment of an RF positioning node, which can be deployed in other ways. Hence, the RF positioning nodes do not need to include the light source 111, driver circuit 112, drive/sense circuitry 535, and detector(s) 565 components. Moreover, the RF positioning nodes deployed on-premises do not need to be installed in an indoor space 105, but can instead be installed in an outdoor space.

FIG. 5 is a block diagram of a luminaire 110A-W that communicates via the luminaire-based positioning system of FIGS. 1A-B and 2A. Luminaire 110A-W is an integrated light fixture that generally includes a power supply 505 driven by a power source 500. Power supply 505 receives power from the power source 500, such as an AC mains, battery, solar panel, or any other AC or DC source. Power supply 505 may include a magnetic transformer, electronic transformer, switching converter, rectifier, or any other similar type of circuit to convert an input power signal into a power signal suitable for luminaire 110A-W.

Luminaire 110A-W furthers include the driver circuit 112 and the light source 111. Driver circuit 112 is coupled to light source 111 and drives that light source 111 by regulating the power to light source 111 by providing a constant quantity or power to light source 111 as its electrical properties change with temperature, for example. Driver circuit 112 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 112 is manufactured by EldoLED™.

Driver circuit 112 can further include an AC or DC current source or voltage source, a regulator, an amplifier (such as a linear amplifier or switching amplifier), a buck, boost, or buck/boost converter, or any other similar type of circuit or component. Driver circuit 112 outputs a variable voltage or current to the light source 111 that may include a DC offset, such that its average value is nonzero, and/or an AC voltage. For purposes of communication and control, luminaire 110A-W can be treated as single addressable device that can be configured to operate as a member of one or more lighting control groups or zones. The luminaire 110A-W is line powered and remains operational as long as power is available.

Luminaire 110A-W also includes a dual-band wireless radio communication interface 113 system that includes two local wireless network communication interfaces 113A-B (transceivers). It should be understood that "dual-band" means communications over two separate RF bands. The communication over the two separate RF bands can occur simultaneously (concurrently); however, it should be understood that the communication over the two separate RF bands may not actually occur simultaneously. In our example, luminaire 110A-W has a radio set that includes radio 113B for sub-GHz communications and another radio 113A for Bluetooth RF communications. Transport layer methods ride on the network layer function of the local wireless network communication interfaces 113A-B.

Luminaire 110A-W includes power distribution circuitry 525, a micro-control unit (MCU) 530, drive/sense circuitry 535, and detector(s) 565. As shown, MCU 530 is coupled to driver circuit 112 and controls the light source operation of the light source 111. MCU 530 includes a luminaire memory 114 (volatile and non-volatile) and a luminaire processor 115 (CPU). The luminaire memory 114 includes the luminaire commissioning programming 116 (which can be firmware) for automated initialization and the depicted data of neighboring commissioned luminaire identifiers, timestamps 570A-T (e.g., date and time), and RSSI measurements 136A-T to the neighboring commissioned luminaires. Luminaire 110A-Z includes additional programming logic in the luminaire memory 114 for lighting control operations and commissioning, maintenance, and diagnostic operations. The power distribution circuitry 525 distributes power and ground voltages to the MCU 530, drive/sense circuitry 535, wireless transceivers 113A-B, and detector(s) 565 to provide reliable operation of the various circuitry.

As shown, luminaire 110A-W includes detector(s) 565, such as an in-fixture daylight sensor, an occupancy sensor, an audio sensor, a temperature sensor, or other environmental sensor. Detector(s) 565 may be based on Acuity Brands Lighting's commercially available xPoint® Wireless ES7 product. Drive/sense circuitry 535, such as application firmware, drives the in-fixture occupancy, audio, and photo sensor hardware. Drive/sense circuitry 535 of luminaire 110A-W detects state changes in the detector(s) 565, such as occupancy, daylight, and audio sensors.

Luminaires 110A-W can communicate via a local wireless communication network 106 that is a mesh network. As shown, the luminaire 110A-Z further includes luminaire commissioning programming 116 in the luminaire memory 114. Execution of the luminaire commissioning programming 116 by the luminaire processor 115 configures each uncommissioned luminaire 110A-T to implement the following functions. In response to receiving the scan request message 133A-T, each uncommissioned luminaire 110A-T sends, via the luminaire local network communication interface 113, a mesh command 117 over the mesh network requesting the neighboring commissioned luminaires transmit packets 121A-T including a respective commissioned luminaire identifier and a timestamp 570A-T. For example, for uncommissioned luminaire 110T, the neighboring commissioned luminaires and the received commissioned luminaire identifiers are 110W and 110V. Based on the respective commissioned luminaire identifier (e.g., 110W and 110V) and the timestamp 570A-T of the transmitted packets 121A-T, each uncommissioned luminaire 110A-T calculates the respective RSSI measurement 136A-T of the uncommissioned luminaire to each of the neighboring commissioned luminaires. For example, for uncommissioned luminaire 110T, RSSI measurements 136T are calculated for neighboring commissioned luminaires 110W and 110V, respectively.

Each uncommissioned luminaire 110A-T sends, via the luminaire local wireless network communication interface 113, the scan response message 134A-T through a transport layer of the mesh network back to the gateway 120. The scan response message 134A-T includes: (i) the respective uncommissioned luminaire identifier 110A-T, (ii) the neighboring commissioned luminaire list 135U-W of commissioned luminaire identifiers of the neighboring commissioned luminaires. For example, for uncommissioned luminaire 110T, the neighboring commissioned luminaires and the received commissioned luminaire identifiers are 110W and 110V. The scan response message 134A-T further includes: (iii) the calculated respective RSSI measurement 136T of the uncommissioned luminaire to each of the neighboring commissioned luminaires. For example, for uncommissioned luminaire 110T, RSSI measurements 136T are calculated for neighboring commissioned luminaires 110W and 110V, respectively.

The scan response message 134A-T is divided into a plurality of advertisement packets 121A-T (e.g., BLE protocol). Each advertisement packet includes the respective uncommissioned luminaire identifier 110A-T, the commissioned luminaire identifier of one of the neighboring commissioned luminaires 110U-W, and the calculated respective RSSI measurement 136A-T. Execution of the gateway commissioning programming 128 by the gateway processor 123 configures the gateway 120 to implement functions to aggregate the plurality of advertisement packets into the scan response message 134A-T sent from each uncommissioned luminaire 110A-T based on the respective uncommissioned luminaire identifier 110A-T.

Figure 6:
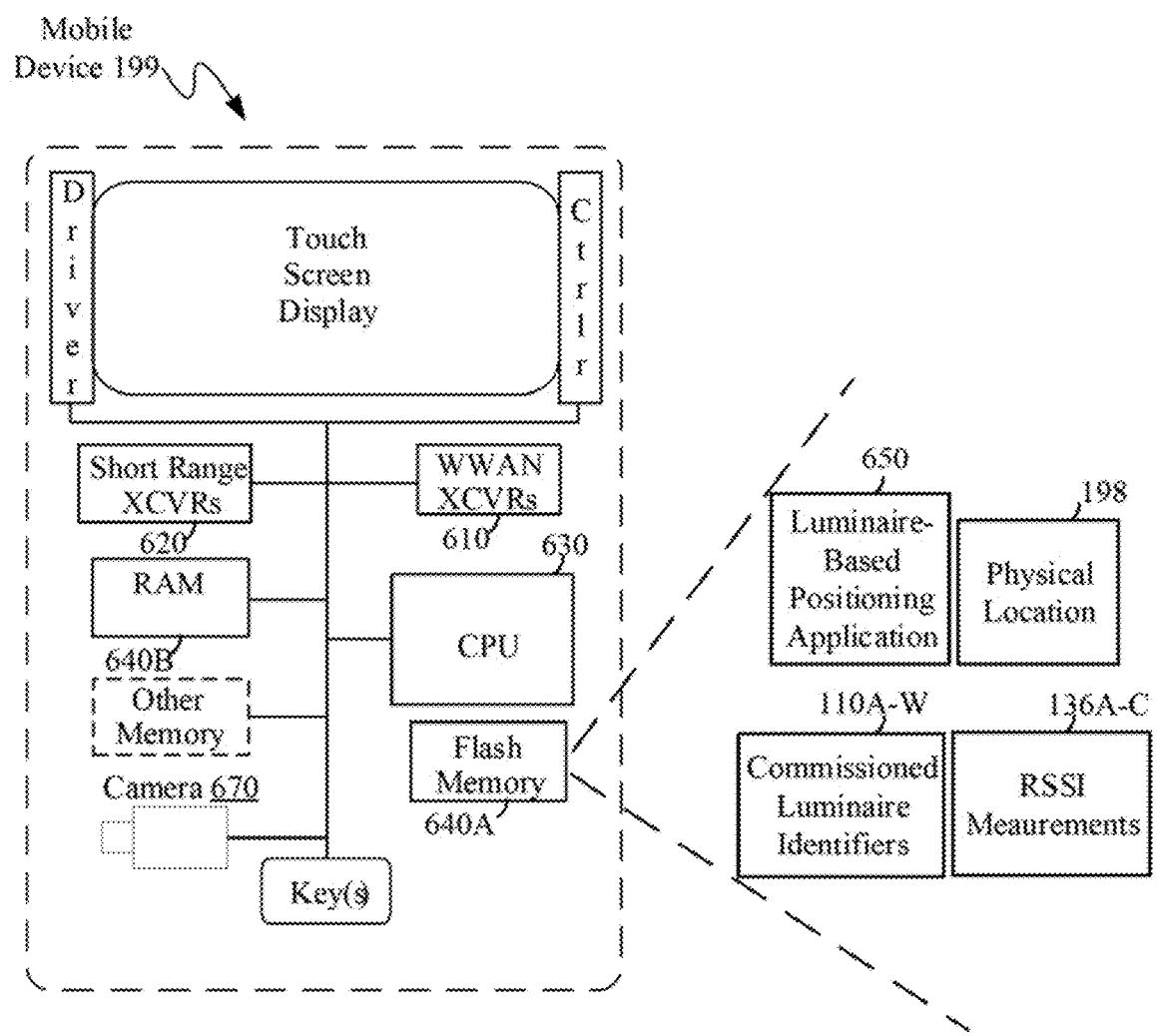
FIG. 6 is a block diagram of the mobile device that communicates via the luminaire-based positioning system of FIGS. 1A-B and 2A.

FIG. 6 is a block diagram of the mobile device 199 that communicates via the luminaire-based positioning system 100 of FIGS. 1A-B and 2A. Shown are elements of a touch screen type of mobile device 199 having a luminaire-based positioning application 650 loaded, although other non-touch type mobile devices can be used in the luminaire-based positioning communications and controls are under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 6 therefore provides a block diagram illustration of the example mobile device 199 having a touch screen display for displaying content and receiving user input as (or as part of) the user interface.

The activities that are the focus of discussions here typically involve data communications related to determining a physical location 198 of a user (e.g., human or robot) of the mobile device 199 traversing or otherwise navigating through the indoor space 105. As shown in FIG. 6, the mobile device 199 includes at least one digital or analog digital transceiver 620, which is a network communication interface for wireless communications. For example, short range XCVR 620 is for short-range digital communication over the local wireless communication network 106, such as NFC, VLC, DECT, ZigBee, Bluetooth, or WiFi. Mobile device 199 can also include a camera 670, such as a rolling shutter camera, for VLC-based positioning RSSI measurements, as described with reference to FIGS. 1A-B above.

Mobile device 199 also includes another wireless wide area network transceiver (WWAN XCVR) 610 for communication over a wide area wireless mobile communication network. The WWAN transceiver 610 (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." In one example, the transceiver 610 sends and receives a variety of signaling messages in support of various data services provided by a network of a wireless service provider, to user(s) via a mobile communication network (not shown).

Transceivers 610, 620 connect through radio frequency (RF) send-and-receive amplifiers (not shown) to an antenna (not shown). For example, transceivers 610, 620 provide two-way wireless communication of information including digitized audio signals, still image and/or video signals, web page information for display as well as web related inputs, and various types of mobile communications to/from the mobile device 199 to the commissioned luminaires 110A-W and/or gateway 120 for detecting the physical location 198A-C of the mobile device 199 of the user 197 in the indoor space 105. Several of these types of communications through the transceivers 610, 620 and a network, as discussed previously, relate to protocols and procedures in support of communications with the commissioned luminaires 110A-W for calculating an indoor position of the mobile device 199. Such communications, for example, may utilize IP packet data transport over the local wireless communication network (e.g., mesh network) 106 utilizing the digital short range wireless transceiver (XCVR) 620.

Mobile device 199 also supports wireless local area network communications over Wi-Fi, instead of or in addition to data communications using Bluetooth. Hence, in the example of FIG. 6, for packet data communications, the mobile device 199 can include multiple short range XCVRs 620, such as both a Wi-Fi transceiver and a Bluetooth transceiver and associated antenna (not shown). Although Bluetooth and Wi-Fi are used here as examples, the transceiver 620 may take the form of any available two-way wireless local area network (WLAN) transceiver of a type that is compatible with one or more standard protocols of communication implemented in wireless local area networks, such as one of the Wi-Fi standards under IEEE 802.11 and/or WiMAX and wireless mesh network standards (e.g., Zigbee).

The mobile device 199 further includes a microprocessor, shown as CPU 630, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 630, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 630 or processor hardware in smartphone, laptop computer, and tablet.

Returning more specifically to the smartphone example of FIG. 6, the microprocessor 630 serves as a programmable host controller for the mobile device 199 by configuring the mobile device 199 to perform various operations, for example, in accordance with instructions or programming executable by processor 630. For example, such operations may include various general operations of the smartphone, as well as operations related to communications with the commissioned luminaires 110A-W and the gateway 120. Although a processor may be configured by use of hardwired logic, typical processors in mobile devices are general processing circuits configured by execution of programming.

The mobile device 199 includes a memory or storage system, for storing data and programming. In the example, the memory system may include a flash memory 640A and a random access memory (RAM) 640B. The RAM 640B serves as short term storage for instructions and data being handled by the processor 630, e.g. as a working data processing memory. The flash memory 640A typically provides longer term storage.

Hence, in the example of mobile device 199, the flash memory 640A is used to store programming or instructions for execution by the processor 320. Depending on the type of device, the mobile device 199 stores and runs a mobile operating system through which specific applications, including a luminaire-based positioning application 650 (which may be a web browser executing a dynamic web page), runs on mobile device 199. Examples of mobile operating systems include Google Android, Apple iOS (I-Phone or iPad devices), Windows Mobile, Amazon Fire OS, RIM BlackBerry operating system, or the like. Flash memory 640A may also be used to store mobile configuration settings for different mobile applications or services executable at mobile device 199 using processor 630. As shown, the flash memory 640A, includes: RSSI measurements 136A-W between the mobile device 199 and the three or more commissioned luminaires 110A-W, commissioned luminaire identifiers 110A-W of the three or more commissioned luminaires 110A-W, and the calculated physical location 198 of the mobile device 199 in the indoor space 105.

Any of the automated initialization functionality described herein for the luminaires 110A-Z, gateway 120, cloud computing device 166, and mobile device 199 can be embodied in one more applications as described previously. According to some embodiments, "function," "functions," "application," "applications," "instruction," "instructions," or "programming" are program(s) that execute functions defined in the programs. Various programming languages can be employed to create one or more programs, structured in a variety of manners, such as object-oriented programming languages (e.g., Objective-C, Java, or C++) or procedural programming languages (e.g., C or assembly language). In general, the term "programming," as used herein, refers to logic embodied in hardware or software instructions, such as firmware or applications, which can be written in a programming language, such as Java™, C, C++, C#, for example. A software application can be compiled into executable programs or written in interpreted programming languages, such as Perl, Visual Basic script, HTML, or JavaScript. Software applications may be callable from other applications. Generally, programming applications described herein refer to logical modules that may be merged with other modules or divided into sub-module despite their physical organization. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine readable medium. For example, programming code could include code for automated initialization and DBSCAN. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the media gateway and client device. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an"

does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A luminaire-based positioning system comprising:
a plurality of luminaires located in an indoor space, each respective one of the luminaires including:
   a light source;
   a driver circuit coupled to the light source to control light source operation;
   a luminaire local wireless network communication interface configured for wireless communication over a local wireless communication network;
   a luminaire memory including a luminaire identifier;
   a luminaire processor coupled to the driver circuit, the luminaire local network communication interface, and the luminaire memory; and
a gateway including:
   a gateway network communication interface system including a gateway local wireless network communication interface configured for wireless communication over the local wireless communication network;
   a gateway memory including:
      a luminaire node map of commissioned luminaires in the indoor space, the luminaire node map having:
         multiple commissioned luminaire identifier settings, including a respective commissioned luminaire identifier setting of each commissioned luminaire in the indoor space; and
         multiple sets of commissioned location coordinates, each set of commissioned location coordinates stored in association with the respective commissioned luminaire identifier setting;
      an undesignated luminaire roster of undesignated luminaires in the indoor space, each undesignated luminaire associated with a respective set of undesignated location coordinates;
      a plurality of projected received signal strength indication (RSSI) values, including:
         a first projected RSSI value between a first commissioned luminaire and a first undesignated luminaire, and
         a second projected RSSI value between the first commissioned luminaire and a second undesignated luminaire; and
   a gateway processor coupled to the gateway network communication interface system and the gateway memory; and
   gateway commissioning programming in the gateway memory, wherein execution of the gateway self-commissioning programming by the gateway processor configures the gateway to implement functions, including functions to:
      based on a respective RSSI measurement of a respective uncommissioned luminaire to each of neighboring commissioned luminaires and the plurality of projected RSSI values of each of the neighboring commissioned luminaires to neighboring undesignated luminaires, determine an association of the respective uncommissioned luminaire to a safest fit undesignated luminaire of the undesignated luminaire roster; and
      assign to the respective uncommissioned luminaire the set of undesignated location coordinates of the safest undesignated luminaire as a determined set of uncommissioned location coordinates; and
      adjust the luminaire node map for the determined set of uncommissioned location coordinates based on the determined safe fit assignment by adding a new set of commissioned location coordinates stored in association with the respective uncommissioned luminaire identifier that most safely fit the determined set of uncommissioned location coordinates.

2. The luminaire-based positioning system of claim 1, wherein execution of the gateway commissioning programming by the gateway processor configures the gateway to implement functions, including functions to:
receive, via the gateway local wireless network communication interface, a respective uncommissioned luminaire identifier from a plurality of uncommissioned luminaires in the indoor space; and
store the respective uncommissioned luminaire identifier of the uncommissioned luminaires in an uncommissioned luminaire list;
send, via the gateway local wireless network communication interface, a scan request message to each uncommissioned luminaire requesting a scan response message;
in response to sending the scan request message to each uncommissioned luminaire, receive from each of the uncommissioned luminaires the scan response message including:
   (i) the respective uncommissioned luminaire identifier,
   (ii) a neighboring commissioned luminaire list of commissioned luminaire identifiers of neighboring commissioned luminaires, and
   (iii) the respective RSSI measurement of the uncommissioned luminaire to each of the neighboring commissioned luminaires.

3. The luminaire-based positioning system of claim 2, wherein execution of the gateway commissioning programming by the gateway processor configures the gateway to implement functions, including functions to:

in response to sending the scan request message to each uncommissioned luminaire:
calculate a respective RSSI measurement match probability between the respective uncommissioned luminaire to each of the neighboring commissioned luminaires based on the respective RSSI measurement and the plurality of projected RSSI values of each of the neighboring commissioned luminaires to neighboring undesignated luminaires; and
based on the calculated respective RSSI measurement match probability to each of the projected RSSI values and the set of commissioned location coordinates of each of the neighboring commissioned luminaires, select a set of undesignated location coordinates to associate with the respective uncommissioned luminaire;
determine an assignment of the undesignated location coordinates of a safest undesignated luminaire of the undesignated luminaires in the undesignated luminaire roster to a set of uncommissioned location coordinates of the respective uncommissioned luminaire; and
adjust the luminaire node map for the set of uncommissioned location coordinates based on the determined safe fit assignment by adding a new set of commissioned location coordinates stored in association with the respective uncommissioned luminaire identifier that most safely fit the set of undesignated location coordinates.

4. The luminaire-based positioning system of claim 2, wherein:
the local wireless communication network is a mesh network; and
the luminaire further includes luminaire commissioning programming in the luminaire memory, wherein execution of the luminaire commissioning programming by the luminaire processor configures each uncommissioned luminaire to implement functions, including functions to:
in response to receiving the scan request message, send, via the luminaire local network communication interface, a mesh command over the mesh network requesting the neighboring commissioned luminaires transmit packets including a respective commissioned luminaire identifier and a timestamp; and
based on the respective commissioned luminaire identifier and the timestamp of the transmitted packets, calculate the respective RSSI measurement of the uncommissioned luminaire to each of the neighboring commissioned luminaires.

5. The luminaire-based positioning system of claim 4, wherein execution of the luminaire commissioning programming by the luminaire processor configures each uncommissioned luminaire to implement functions, including functions to:
send, via the luminaire local wireless network communication interface, the scan response message through a transport layer of the mesh network back to the gateway, the scan response message including:
(i) the respective uncommissioned luminaire identifier,
(ii) the neighboring commissioned luminaire list of commissioned luminaire identifiers of the neighboring commissioned luminaires, and
(iii) the calculated respective RSSI measurement of the uncommissioned luminaire to each of the neighboring commissioned luminaires.

6. The luminaire-based positioning system of claim 5, wherein:
the scan response message is divided into a plurality of advertisement packets, each advertisement packet including the respective uncommissioned luminaire identifier, the commissioned luminaire identifier of one of the neighboring commissioned luminaires, and the calculated respective RSSI measurement; and
execution of the gateway commissioning programming by the gateway processor configures the gateway to implement functions, including functions to:
aggregate the plurality of advertisement packets into the scan response message sent from each uncommissioned luminaire based on the respective uncommissioned luminaire identifier.

7. The luminaire-based positioning system of claim 1, wherein:
the plurality of projected RSSI values projects the first projected RSSI value by reducing a respective power level value of the first commissioned luminaire by a constant factor multiplied by a distance between the first commissioned luminaire and the first undesignated luminaire.

8. The luminaire-based positioning system of claim 1, wherein:
the luminaire node map further comprises:
one or more fixed objects with a known radio signal impedance; and
the plurality of projected RSSI values projects the first projected RSSI value by reducing a respective power level value of the first commissioned luminaire by a constant factor multiplied by a distance between the first commissioned luminaire and the first undesignated luminaire, and further reducing the respective power level value by the known radio signal impedance of the one or more fixed objects that a projected radio signal passes through from the first undesignated luminaire to the first commissioned luminaire.

9. The luminaire-based positioning system of claim 1, wherein:
the gateway memory further includes one or more alternative luminaire node maps, and a one or more pluralities of alternative projected RSSI values, including:
a first alternative projected RSSI value between a first alternative sender luminaire and a first alternative receiver luminaire, and
a first alternative vector comprising:
a first alternative magnitude,
a first alternative direction,
a first alternative origin at the set of commissioned location coordinates of the first alternative sender luminaire, and
a first alternative terminal point at the set of commissioned location coordinates of the first alternative receiver luminaire;
an alternative second RSSI measurement between the first alternative sender luminaire and a second alternative receiver luminaire, and
a second alternative vector comprising:
a second alternative magnitude,
a second alternative direction,
a second alternative origin at the set of commissioned location coordinates of the second alternative sender luminaire, and
a second alternative terminal point at the set of commissioned location coordinates of the second alternative receiver luminaire;
an initial vector comprising:
an initial magnitude, an initial direction,
an initial origin at the set of commissioned location coordinates of the first commissioned luminaire,
an initial terminal point at the set of undesignated location coordinates of the first undesignated luminaire; and
gateway commissioning programming in the gateway memory, wherein execution of the gateway self-commissioning programming by the gateway processor configures the gateway to implement functions, including functions to:
based on the initial vector, assign to the first projected RSSI value the alternative RSSI measurement value of the safest first or second alternative vector.

10. The luminaire-based positioning system of claim 9, wherein execution of the gateway commissioning programming by the gateway processor configures the gateway to implement functions, including functions to:
calculate a respective vector match probability between the initial vector and each alternative vector based on the direction and magnitude of the initial vector and the direction and magnitude of each of the alternative vectors;
based on the calculated respective vector match probability to each of the alternative vectors and the initial vector, select an alternative RSSI measurement to associate with the first projected RSSI value.

11. The luminaire-based positioning system of claim 1, wherein determining the safe fit assignment of the set of uncommissioned location coordinates of the safest fit undesignated luminaire of the undesignated luminaries in the undesignated luminaire roster further includes reassigning the commissioned luminaires in the luminaire node map that were previously incorrectly assigned to the set of commissioned location coordinates.

12. The luminaire-based positioning system of claim 1, further comprising:
a cloud computing device including:
a cloud computing device wide area network (WAN) communication interface configured for communication over a WAN;
a cloud computing device memory;
a cloud computing device processor coupled to the cloud computing device WAN communication interface and the cloud computing device memory; and
cloud computing device commissioning programming in the cloud computing device memory;
wherein:
the gateway network communication interface system further includes a gateway WAN communication interface for communication over the WAN;
execution of the gateway commissioning programming by the gateway processor configures the gateway to implement functions, including functions to:
in response to receiving from each of the uncommissioned luminaires the scan response message, send, via the gateway WAN communication interface, to the cloud computing device:
(a)(i) the respective uncommissioned luminaire identifier, (ii) the neighboring commissioned luminaire list, and (iii) the respective RSSI measurement; and
(b) the luminaire node map.

13. The luminaire-based positioning system of claim 12, wherein execution of the cloud computing device commissioning programming by the cloud computing device processor configures the cloud computing device to implement functions, including functions to:
for each of the uncommissioned luminaires in the uncommissioned luminaire list:
calculate a respective RSSI measurement match probability between the respective uncommissioned luminaire to each of the neighboring commissioned luminaires based on the respective RSSI measurement and the plurality of projected RSSI values of each of the neighboring commissioned luminaires to neighboring undesignated luminaires; and
based on the calculated respective RSSI measurement match probability to each of the projected RSSI values and the set of commissioned location coordinates of each of the neighboring commissioned luminaires, select a set of undesignated location coordinates to associate with the uncommissioned luminaire;
determine an assignment of the undesignated location coordinates of a safest undesignated luminaire of the undesignated luminaries in the undesignated luminaire roster to a set of uncommissioned location coordinates of the respective uncommissioned luminaire; and
adjust the luminaire node map for the set of uncommissioned location coordinates based on the determined safe fit assignment by adding a new set of commissioned location coordinates stored in association with the respective uncommissioned luminaire identifier that most safely fit the set of undesignated location coordinates; and
send, via the cloud computing device WAN communication interface, to the gateway the adjusted luminaire node map.

14. The luminaire-based positioning system of claim 12, wherein execution of the gateway commissioning programming by the gateway processor configures the gateway to implement functions, including functions to:
receive, via the gateway WAN communication interface, from the cloud computing device the adjusted luminaire node map;
replace the luminaire node map with the adjusted luminaire node map; and
determine a physical location of a mobile device of a user in the indoor space based on the adjusted luminaire node map.

15. A luminaire-based positioning system comprising:
a plurality of luminaires located in an indoor space, each respective one of the luminaires including:
a light source;
a driver circuit coupled to the light source to control light source operation;
a luminaire local wireless network communication interface configured for wireless communication over a local wireless communication network;
a luminaire memory including a luminaire identifier;
a luminaire processor coupled to the driver circuit, the luminaire local network communication interface, and the luminaire memory; and
a gateway including:
a gateway network communication interface system including a gateway local wireless network communication interface configured for wireless communication over the local wireless communication network;
a gateway memory including:
a luminaire node map of commissioned luminaires in the indoor space, the luminaire node map having:

multiple commissioned luminaire identifier settings, including a respective commissioned luminaire identifier setting of each commissioned luminaire in the indoor space; and multiple sets of commissioned location coordinates, each set of commissioned location coordinates stored in association with the respective commissioned luminaire identifier setting;

an undesignated luminaire roster of undesignated luminaires in the indoor space, each undesignated luminaire associated with a respective set of undesignated location coordinates;

a plurality of projected distance values, including:
a first projected distance value between a first commissioned luminaire and a first undesignated luminaire, and
a second projected distance value between the first commissioned luminaire and a second undesignated luminaire; and a gateway processor coupled to the gateway network communication interface system and the gateway memory; and gateway commissioning programming in the gateway memory, wherein execution of the gateway self-commissioning programming by the gateway processor configures the gateway to implement functions, including functions to:

based on a respective distance measurement of a respective uncommissioned luminaire to each of neighboring commissioned luminaires and the plurality of projected distance values of each of the neighboring commissioned luminaires to neighboring undesignated luminaires, determine an association of the respective uncommissioned luminaire to a safest fit undesignated luminaire of the undesignated luminaire roster; and assign to the respective uncommissioned luminaire the set of undesignated location coordinates of the safest undesignated luminaire as a determined set of uncommissioned location coordinates; and adjust the luminaire node map for the determined set of uncommissioned location coordinates based on the determined safe fit assignment by adding a new set of commissioned location coordinates stored in association with the respective uncommissioned luminaire identifier that most safely fit the determined set of uncommissioned location coordinates.

16. The luminaire-based positioning system of claim 15, wherein execution of the gateway commissioning programming by the gateway processor configures the gateway to implement functions, including functions to:

receive, via the gateway local wireless network communication interface, a respective uncommissioned luminaire identifier from a plurality of uncommissioned luminaires in the indoor space; and store the respective uncommissioned luminaire identifier of the uncommissioned luminaires in an uncommissioned luminaire list;

send, via the gateway local wireless network communication interface, a scan request message to each uncommissioned luminaire requesting a scan response message;

in response to sending the scan request message to each uncommissioned luminaire, receive from each of the uncommissioned luminaires the scan response message including:
(i) the respective uncommissioned luminaire identifier,
(ii) a neighboring commissioned luminaire list of commissioned luminaire identifiers of neighboring commissioned luminaires, and
(iii) the respective distance measurement of the uncommissioned luminaire to each of the neighboring commissioned luminaires.

17. The luminaire-based positioning system of claim 16, wherein execution of the gateway commissioning programming by the gateway processor configures the gateway to implement functions, including functions to:

in response to sending the scan request message to each uncommissioned luminaire:
calculate a respective distance measurement match probability between the respective uncommissioned luminaire to each of the neighboring commissioned luminaires based on the respective distance measurement and the plurality of projected distance values of each of the neighboring commissioned luminaires to neighboring undesignated luminaires; and
based on the calculated respective distance measurement match probability to each of the projected distance values and the set of commissioned location coordinates of each of the neighboring commissioned luminaires, select a set of undesignated location coordinates to associate with the respective uncommissioned luminaire;

determine an assignment of the undesignated location coordinates of a safest undesignated luminaire of the undesignated luminaires in the undesignated luminaire roster to a set of uncommissioned location coordinates of the respective uncommissioned luminaire; and adjust the luminaire node map for the set of uncommissioned location coordinates based on the determined safe fit assignment by adding a new set of commissioned location coordinates stored in association with the respective uncommissioned luminaire identifier that most safely fit the set of undesignated location coordinates.

18. The luminaire-based positioning system of claim 16, wherein:
the local wireless communication network is a mesh network; and
the luminaire further includes luminaire commissioning programming in the luminaire memory, wherein execution of the luminaire commissioning programming by the luminaire processor configures each uncommissioned luminaire to implement functions, including functions to:
in response to receiving the scan request message, send, via the luminaire local network communication interface, a mesh command over the mesh network requesting the neighboring commissioned luminaires transmit packets including a respective commissioned luminaire identifier and a timestamp; and
based on the respective commissioned luminaire identifier and the timestamp of the transmitted packets, calculate the respective distance measurement of the uncommissioned luminaire to each of the neighboring commissioned luminaires.

19. The luminaire-based positioning system of claim 15, wherein:
the gateway memory further includes one or more alternative luminaire node maps, and a one or more pluralities of alternative projected distance values, including:

a first alternative projected distance value between a first alternative sender luminaire and a first alternative receiver luminaire, and
a first alternative vector comprising:
  a first alternative magnitude,
  a first alternative direction,
  a first alternative origin at the set of commissioned location coordinates of the first alternative sender luminaire, and
  a first alternative terminal point at the set of commissioned location coordinates of the first alternative receiver luminaire;
an alternative second distance measurement between the first alternative sender luminaire and a second alternative receiver luminaire, and
a second alternative vector comprising:
  a second alternative magnitude,
  a second alternative direction,
  a second alternative origin at the set of commissioned location coordinates of the second alternative sender luminaire, and
  a second alternative terminal point at the set of commissioned location coordinates of the second alternative receiver luminaire;
an initial vector comprising:
  an initial magnitude,
  an initial direction,
  an initial origin at the set of commissioned location coordinates of the first commissioned luminaire,
  an initial terminal point at the set of undesignated location coordinates of the first undesignated luminaire; and
gateway commissioning programming in the gateway memory, wherein execution of the gateway self-commissioning programming by the gateway processor configures the gateway to implement functions, including functions to:
  based on the initial vector, assign to the first projected distance value the alternative distance measurement value of the safest first or second alternative vector.

20. The luminaire-based positioning system of claim 19, wherein execution of the gateway commissioning programming by the gateway processor configures the gateway to implement functions, including functions to:
  calculate a respective vector match probability between the initial vector and each alternative vector based on the direction and magnitude of the initial vector and the direction and magnitude of each of the alternative vectors;
  based on the calculated respective vector match probability to each of the alternative vectors and the initial vector, select an alternative distance measurement to associate with the first projected distance value.

* * * * *